United States Patent
Napolskikh et al.

(10) Patent No.: US 12,482,134 B2
(45) Date of Patent: Nov. 25, 2025

(54) JOINT CAMERA AND INERTIAL MEASUREMENT UNIT CALIBRATION

(71) Applicant: Magic Leap, Inc., Plantation, FL (US)

(72) Inventors: Igor Napolskikh, Plantation, FL (US); Ankur Gupta, Plantation, FL (US); Yu-Hsiang Huang, Plantation, FL (US); Mohamed Souiai, Plantation, FL (US); Etienne Gregoire Grossman, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 453 days.

(21) Appl. No.: 18/028,176

(22) PCT Filed: Sep. 15, 2021

(86) PCT No.: PCT/US2021/050502
§ 371 (c)(1),
(2) Date: Mar. 23, 2023

(87) PCT Pub. No.: WO2022/066486
PCT Pub. Date: Mar. 31, 2022

(65) Prior Publication Data
US 2023/0377197 A1 Nov. 23, 2023

Related U.S. Application Data

(60) Provisional application No. 63/082,312, filed on Sep. 23, 2020.

(51) Int. Cl.
*G06T 7/80* (2017.01)
(52) U.S. Cl.
CPC .................... *G06T 7/80* (2017.01)

(58) Field of Classification Search
CPC .......... G06T 7/80; G01C 11/06; G01C 25/005
See application file for complete search history.

(56) References Cited

U.S. PATENT DOCUMENTS 8,736,636 B2  5/2014  Kang
8,793,770 B2  7/2014  Lim
(Continued)

OTHER PUBLICATIONS

Chen and Schwertfeger, "Heterogeneous Multi-sensor Calibration based on Graph Optimization," cs.RO, Submitted on Aug. 24, 2019, arXiv:1905.11167, 7 pages.
(Continued)

*Primary Examiner* — Molly Wilburn
(74) *Attorney, Agent, or Firm* — Fish & Richardson P.C.

(57) ABSTRACT

Methods, systems, and apparatus, including computer programs encoded on computer storage media, for calibrating an augmented reality device using camera and inertial measurement unit data. In some implementations, a bundle adjustment process jointly optimizes or estimates states of the augmented reality device. The process can use, as input, visual and inertial measurements as well as factory-calibrated sensor extrinsic parameters. The process performs bundle adjustment and uses non-linear optimization of estimated states constrained by the measurements and the factory calibrated extrinsic parameters. The process can jointly optimize inertial constraints, IMU calibration, and camera calibrations. Output of the process can include most likely estimated states, such as data for a 3D map of an environment, a trajectory of the device, and/or updated extrinsic parameters of the visual and inertial sensors (e.g., cameras and IMUs).

20 Claims, 5 Drawing Sheets

(56) References Cited

U.S. PATENT DOCUMENTS

| | | | |
|---|---|---|---|
| 8,823,855 B2 | 9/2014 | Hwang | |
| 8,874,673 B2 | 10/2014 | Kim | |
| 9,417,689 B1* | 8/2016 | Ramaswamy | G06F 3/01 |
| 9,759,918 B2 | 9/2017 | Ebstyne et al. | |
| 2018/0124387 A1 | 5/2018 | Zhao et al. | |
| 2019/0197982 A1 | 6/2019 | Chi et al. | |

OTHER PUBLICATIONS

Deray et al., "Joint on-manifold self-calibration of odometry model and sensor extrinsics using pre-integration," Paper, Presented at Proceedings of the 2019 European Conference on Mobile Robots (ECMR), Prague, Czech Republic, Sep. 4-6, 2019, 6 pages.

Forster et al., "On-Manifold Preintegration for Real-Time Visual-Inertial Odometry," IEEE Transactions on Robotics (TRO), Submitted on Oct. 30, 2016, arXiv:1512.02363, 20 pages.

Furgale et al., "Unified Temporal and Spatial Calibration for Multi-Sensor Systems," Paper, Presented at Proceedings of the 2013 IEEE/RSJ International Conference on Intelligent Robots and Systems, Tokyo, Japan, Nov. 3-7, 2013, 7 pages.

Hinzmann et al., "Flexible Stereo: Constrained, Non-Rigid, Wide-Baseline Stereo Vision for Fixed-Wing Aerial Platforms," Paper, Presented at Proceedings of the 2018 IEEE International Conference on Robotics and Automation (ICRA), Brisbane, QLD, Australia, May 21-25, 2018, 8 pages.

Hinzmann et al., "Flexible Trinocular—Non-rigid Multi-Camera-IMU Dense Reconstruction for UAV Navigation and Mapping," Paper, Presented at Proceedings of the IEEE International Conference on Intelligent Robots and Systems (IROS) 2019, Macau, China, Submitted on Aug. 23, 2019, arXiv:1908.08891, 6 pages.

International Search Report and Written Opinion in International Appln. No. PCT/US2021/050502, mailed Dec. 16, 2021, 12 pages.

Mur-Artal and Tardos, "Visual-Inertial Monocular SLAM With Map Reuse," IEEE Robotics and Automoation Letters, Apr. 2017, 2(2):796-803.

Rehder et al., "Extending kalibr: Calibrating the Extrinsics of Multiple IMUs and of Individual Axes," Paper, Presented at Proceedings of the 2016 IEEE International Conference on Robotics and Automation (ICRA), Stockholm, Sweden, May 16-21, 2016, pp. 4304-4311.

Wikipedia.org [online], "Cardinal point (optics)," Jan. 2020, retrieved on Apr. 17, 2023, retrieved from URL<https://en.wikipedia.org/w/index.php?title=Cardinal_point_(optics)&oldid=936508381>, 6 pages.

Wikipedia.org [online], "Levenberg-Marquardt algorithm," Jun. 2020, retrieved on Apr. 17, 2023, retrieved from URL<https://en.wikipedia.org/w/index.php?title=Levenberg%E2%80%93Marquardt_algorithm&oldid=962714983>, 6 pages.

\* cited by examiner

JOINT CAMERA AND INERTIAL MEASUREMENT UNIT CALIBRATION

CROSS REFERENCE TO RELATED APPLICATIONS

The present application is a National Stage Application of International Application No. PCT/US2021/050502, filed Sep. 15, 2021, which claims the benefit of U.S. Provisional Patent Application No. 63/082,312, filed Sep. 23, 2020, both of which are incorporated herein by reference in their entirety.

BACKGROUND

Augmented reality ("AR") devices can include multiple sensors. Some examples of sensors include cameras, accelerometers, gyroscopes, global positioning system receivers, and a magnetometer, e.g., a compass.

An AR device can receive data from the multiple sensors and combine the data to determine output for a user. For instance, an AR device can receive gyroscope and camera data from respective sensors and, using the received data, present content on a display.

SUMMARY

Computer vision systems can generate three-dimensional ("3D") maps of an area using sensor data including image data. As a part of this process, computer vision systems can perform bundle adjustment to optimize predictions of the likely positions at which a device captured images, e.g., key frames, and a group of 3D points. The device can be an AR device, such as an AR headset, or another type of extended reality ("XR") device, such as a virtual reality ("VR") device. The 3D points can be points the computer vision system determines relate to portions of objects depicted within the images.

In some implementations, a bundle adjustment process jointly optimizes or estimates states of the augmented reality device. The process can use, as input, visual and inertial measurements as well as factory-calibrated sensor extrinsic parameters, intrinsic parameters, or both. The process performs bundle adjustment and uses non-linear optimization of estimated states constrained by the measurements and the factory calibrated extrinsic parameters. The process can jointly optimize inertial constraints, inertial measurement unit ("IMU") calibration, and camera calibrations. Output of the process can include most likely estimated states, such as data for a 3D map of an environment, a trajectory of the device, and/or updated extrinsic parameters of the visual and inertial sensors, e.g., cameras and IMUs.

When the device includes two or more cameras, the computer vision system can analyze images captured by the separate cameras at approximately the same time to determine 3D points that are depicted in more than one of the images. For instance, the computer vision system can determine that a point on a house was depicted in two images. The computer vision system can use the 3D points that were depicted in more than one of the images to determine an amount of overlap between the images and a likely position of the cameras that captured the images. The computer vision system can use the likely camera positions to determine a likely position of the device in a physical environment represented by a 3D map.

Although this document may refer to example devices that include two or more cameras, similar processes can be used by a device that includes a single camera and a reference sensor. The reference sensor can be any appropriate type of sensor that captures data about an environment in which the device is located, such as an inertial measurement unit, a depth sensor, or a global positioning system sensor. In general, any of the examples described with reference to two cameras can also apply to a device with a camera and a reference sensor instead of a second camera.

The computer vision system can use, as part of this process, the relative positions of the cameras with respect to each other. For example, when the device took two images substantially concurrently, the computer vision system can use the relative positions of the cameras along with the 3D points depicted in the two images to determine a likely position of the device in the environment when the images were captured, to determine an update to a 3D map of the environment, or both.

When the relative positions of two cameras changes from a default relative position, and the computer vision system uses the relative position, e.g., during bundle adjustment, the calculations generated by the computer vision system can be less accurate than calculations with a correct relative position. To account for this, the computer vision system uses inertial data to determine a corrected relative position for the two cameras. The computer vision system then uses the corrected relative position to determine a likely position of the device when the device substantially concurrently captured images using the two cameras, to update the 3D map of the environment, or both.

The computer vision system can receive the inertial data from one or more inertial measurement units ("IMUs") included in the device. The IMUs can measure angular velocity, e.g., using gyroscopes, linear acceleration, e.g., using accelerometers, or both.

The computer vision system can use the inertial data and the images to predict position data, or update a map given the images, inertial data, and, optionally, parameters obtained from a factory calibration process. For instance, the computer vision system can use the images and the inertial data as part of a joint optimization of the device's, e.g., and a user's, surroundings, e.g., represented by 3D points; and motion trajectory, e.g., the poses, velocities, or both, of the device. In some implementations, the computer vision system can use device sensor calibrations, e.g. intrinsic and extrinsic parameters of the camera, models, or both, as part of the joint optimization process. The joint optimization process can improve real-time analysis systems that are based only on visual information by integrating inertial information in the joint estimation process, improving the joint estimation process's accuracy.

In general, one aspect of the subject matter described in this specification can be embodied in methods that include the actions of: receiving, from a camera included in a device, two images (a) of an environment in which the device is located (b) that each depict a portion of the environment that includes a point and is represented by an environment model of the environment that has a three-dimensional map point at a location that represents the point in the environment, the camera having camera calibration data that identifies a first rotation and a first translation that are both between the camera and a first sensor in the device; receiving, from an inertial measurement unit included in the device, inertial data for the device, the inertial measurement unit having inertial measurement unit calibration data that identifies a second rotation and a second translation that are both between the inertial measurement unit and a second sensor in the device; and jointly determining, using the two images, the inertial data, the camera calibration data, the inertial measurement unit calibration data, and the location for the three-dimensional map point or an initial estimated position of the device in the environment: (a) updated camera calibration data that identifies an updated first rotation and an updated first translation between the camera and the first sensor; (b) updated inertial measurement unit calibration data that identifies an updated second rotation and an updated second translation between the inertial measurement unit and the second sensor; and (c) at least one of (i) an updated estimated position of the device in the environment or (ii) an updated environment model of the environment in which the device is located including an updated location for the three-dimensional map point.

In general, one aspect of the subject matter described in this specification can be embodied in methods that include the actions of: receiving, from a camera included in a device, two images (a) of an environment in which the device is located (b) that each depict a portion of the environment that includes a point and is represented by an environment model of the environment that has a three-dimensional map point at a location that represents the point in the environment, the camera having camera calibration data that identifies a first rotation and a first translation that are both between the camera and a first sensor in the device; receiving, from a sensing device included in the device, inertial data for the device, the sensing device having sensor calibration data that identifies a second rotation and a second translation that are both between the sensing device and a second sensor in the device; and jointly determining, using the two images, the inertial data, the camera calibration data, the sensor calibration data, and the location for the three-dimensional map point or an initial estimated position of the device in the environment: (a) updated camera calibration data that identifies an updated first rotation and an updated first translation between the camera and the first sensor; (b) updated sensor calibration data that identifies an updated second rotation and an updated second translation between the sensing device and the second sensor; and (c) at least one of (i) an updated estimated position of the device in the environment or (ii) an updated environment model of the environment in which the device is located including an updated location for the three-dimensional map point.

In general, one aspect of the subject matter described in this specification can be embodied in methods that include the actions of: receiving, from a camera included in a device, two images (a) of an environment in which the device is located (b) that each depict a portion of the environment that includes a point and is represented by an environment model of the environment that has a three-dimensional map point at a location that represents the point in the environment, the camera having camera calibration data that identifies a first rotation and a first translation that are both between the camera and a reference; receiving, from an sensing device included in the device, inertial data for the device, the sensing device having sensor calibration data that identifies a second rotation and a second translation that are both between the sensing device and the reference; and jointly determining, using the two images, the inertial data, the camera calibration data, the sensor calibration data, and the location for the three-dimensional map point or an initial estimated position of the device in the environment: (a) updated camera calibration data that identifies an updated first rotation and an updated first translation between the camera and the reference; (b) updated sensor calibration data that identifies an updated second rotation and an updated second translation between the sensing device and the reference; and (c) at least one of (i) an updated estimated position of the device in the environment or (ii) an updated environment model of the environment in which the device is located including an updated location for the three-dimensional map point.

Other embodiments of these and other aspects discussed herein include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, the first sensor and the second sensor are a same, single sensor, such that the calibration data for the camera and the inertial measurement unit are provided with respect to the same reference. For instance, the first sensor and the second sensor can be the inertial measurement unit that is a reference sensor. In some examples, the first sensor and the second sensor can be the camera that is a reference sensor.

In some implementations, the first sensor includes a reference sensor; and the second sensor includes the reference sensor.

In some implementations, the first sensor includes the inertial measurement unit; and the second sensor includes the camera.

In some implementations, the method can include presenting, on a display, content for the environment using (i) the updated estimated position of the device in the environment, (ii) the updated environment model of the environment in which the device is located including the updated location for the three-dimensional map point, or (iii) both. The method can include presenting, on a display, content for the environment using (i) the updated estimated position of the device in the environment, or (ii) the updated environment model of the environment in which the device is located including the updated location for the three-dimensional map point. The display can be incorporated into the device, e.g., into an extended reality device. The display can include one or more eyepieces, e.g., as part of an extended reality device.

In some implementations, the method includes: determining, using a first penalty function, a first error value that indicates a predicted accuracy of the inertial measurement unit calibration data; and determining, using a second penalty function, a second error value that indicates a predicted accuracy of the camera calibration data. Jointly determining the updated camera calibration data, the updated inertial measurement unit calibration data, and (i) the updated estimated position of the device in the environment or (ii) the updated environment model of the environment includes minimizing the first error value and the second error value.

In some implementations, the method includes: selecting, using the inertial data, a first weight for the first penalty function, the one or more computers configured to select different weights based on different inertial data, wherein:

determining the first error value includes determining, using the first penalty function and the first weight, the first error value.

In some implementations, selecting the first weight includes: determining a covariance for the inertial data; and selecting the first weight using the covariance for the inertial data.

In some implementations, jointly determining the updated camera calibration data, the updated inertial measurement unit calibration data, and (i) the updated estimated position of the device in the environment or (ii) the updated environment model of the environment includes: minimizing the first error value and the second error value includes minimizing a difference between (a) a factory calibration that indicates a default space between the camera and the first sensor, and (b) a currently predicted space between the first and the first sensor.

In some implementations: the default space between the camera and the first sensor includes one or more default translation values and one or more default rotation values; and the currently predicted space between the camera and the first sensor includes one or more currently predicted translation values and one or more currently predicted rotation values.

In some implementations, jointly determining the updated camera calibration data, the updated inertial measurement unit calibration data, and (i) the updated estimated position of the device in the environment or (ii) the updated environment model of the environment includes: determining the updated camera calibration data using the two images, the inertial data, the camera calibration data, the inertial measurement unit calibration data, one or more constraints that indicate a limit for an amount of movement between the camera and the first sensor, and the location for the three-dimensional map point or the initial estimated position of the device in the environment.

In some implementations, the method includes: determining an estimated distance between the inertial measurement unit and the second sensor using the inertial data, wherein jointly determining the updated camera calibration data, the updated inertial measurement unit calibration data, and (i) the updated estimated position of the device in the environment or (ii) the updated environment model of the environment includes: comparing (i) the estimated distance between the inertial measurement unit and the second sensor and (ii) the one or more constraints that indicate the limit for the amount of movement between the camera and the first sensor.

In some implementations, the limit for an amount of movement between the camera and the first sensor includes a maximum distance between the camera and the first sensor, a maximum rotation between a first surface on the camera and a second surface on the first sensor, or both.

In some implementations, the limit for an amount of movement between the camera and the first sensor includes a minimum distance between the camera and the first sensor, a minimum rotation between a first surface on the camera and a second surface on the first sensor, or both.

In some implementations, the limit for an amount of movement between the camera and the first sensor includes a maximum distance between the inertial measurement unit and the second sensor, a maximum rotation between a first surface on the inertial measurement unit and a second surface on the second sensor, or both.

In some implementations: the device includes: the camera and a second different camera; and the inertial measurement unit that is physically closer to the camera than any other cameras included in the device and a second different inertial measurement unit that is physically closer to the second different camera than any other cameras included in the device; and the second sensor is the second different inertial measurement unit.

In some implementations, the limit for an amount of movement between the camera and the first sensor includes a minimum distance between the inertial measurement unit and the second sensor, a minimum rotation between a first surface on the inertial measurement unit and a second surface on the second sensor, or both.

In some implementations: the device includes: the camera and a second different camera; and the inertial measurement unit that is within a threshold physical distance from the camera and a second different inertial measurement unit that is within the threshold physical distance from the second different camera.

In some implementations: the device includes two or more cameras; and jointly determining the updated camera calibration data, the updated inertial measurement unit calibration data, and (i) the updated estimated position of the device in the environment or (ii) the updated environment model of the environment includes jointly determining, for each of the two or more cameras, camera calibration data for the camera with respect to each of the other cameras included in the two or more cameras.

In some implementations: the inertial data comprise position data that represents a position relative to a global reference frame, orientation data, angular velocity data, and linear velocity data; and jointly determining the updated camera calibration data, the updated inertial measurement unit calibration data, and (i) the updated estimated position of the device in the environment or (ii) the updated environment model of the environment includes determining the updated camera calibration data using the two images, the inertial data, the camera calibration data, the inertial measurement unit calibration data, the position data that represents a position relative to the global reference frame, the orientation data, the angular velocity data, and the linear velocity data.

In some implementations: the inertial data comprise acceleration data; and determining the updated camera calibration data includes determining the updated camera calibration data using the two images, the camera calibration data, the inertial measurement unit calibration data, the position data that represents a position relative to the global reference frame, the orientation data, the angular velocity data, the linear velocity data, and the acceleration data.

In some implementations, the system is the device and includes: the camera; and the inertial measurement unit.

In some implementations, the device includes a wearable device. In some implementations, device includes a headset. In some implementations, device includes an augmented reality device.

In some implementations, jointly determining the updated camera calibration data, the updated inertial measurement unit calibration data, and (i) the updated estimated position of the device in the environment or (ii) the updated environment model of the environment includes determining the updated environment model of the environment by updating the environment model.

In some implementations, jointly determining the updated camera calibration data, the updated inertial measurement unit calibration data, and (i) the updated estimated position of the device in the environment or (ii) the updated environment model of the environment includes determining a trajectory of the device in the environment.

In some implementations, the method includes: determining a prior position of the device, where jointly determining the updated camera calibration data, the updated inertial measurement unit calibration data, and (i) the updated estimated position of the device in the environment or (ii) the updated environment model of the environment is responsive to determining that a predetermined time period after the determination of the prior position of the device has expired.

In some implementations, jointly determining the updated camera calibration data, the updated inertial measurement unit calibration data, and (i) the updated estimated position of the device in the environment or (ii) the updated environment model of the environment includes determining an orientation of the device in the environment using the two images and the inertial data.

In some implementations, jointly determining the updated camera calibration data, the updated inertial measurement unit calibration data, and (i) the updated estimated position of the device in the environment or (ii) the updated environment model of the environment includes determining a trajectory of the device in the environment using the two images and the inertial data.

In some implementations, method includes maintaining, in a memory, the environment model of the environment in which the device is located.

In some implementations, jointly determining the updated camera calibration data, the updated inertial measurement unit calibration data, and (i) the updated estimated position of the device in the environment or (ii) the updated environment model of the environment includes determining a mapping of image data for one or more images from the two images to locations in the environment model of the environment in which the device is located.

In some implementations, the method includes: determining, for the camera, whether a difference between (a) the updated camera calibration data and (b) the camera calibration data satisfies a threshold value; and in response to determining that the difference satisfies the threshold value, updating a calibration profile for the camera using the updated camera calibration data.

In some implementations, the updated camera calibration data includes a translation value and a rotation value.

In some implementations, receiving the two images includes receiving at least one image from the two images that depicts data not represented by the environment model of the environment in which the device is located.

The subject matter described in this specification can be implemented in various embodiments and may result in one or more of the following advantages. In some implementations, a device generates more accurate environment maps, more accurately determines its location within an environment, performs a more accurate bundle adjustment process, or two or more of these, using a combination of temporal inertial data, and camera calibration data. For instance, the device can use the temporal inertial data and camera calibration data to determine positions of multiple cameras with respect to a base camera or each other. The device can then use the camera position data to more accurately generate an environment map, determine its physical location, perform more accurate bundle adjustment process, or a combination of two or more of these. The temporal inertial data can include temporal inertial constraints, e.g., obtained from a factory calibration process. The camera calibration data can include camera images of the environment.

In some implementations, the systems and methods described in this document can have an improved initialization process compared to other systems and methods. For instance, a simultaneous localization and mapping system ("SLAM") process can have a more accurate, faster, more robust, or a combination of these, initialization process by using data from more sources compared to other SLAM processes.

A typical bundle adjustment routine optimizes the map either with temporal inertial constraints, e.g., visual inertial bundle adjustment ("VIBA"), or camera calibration constraints, e.g., online calibration bundle adjustment (OCBA). In both types of bundle adjustment, IMU calibration is generally kept fixed. However, the techniques herein improve bundle adjustment by optimizing the map with all of the data sources together: inertial constraints, IMU calibration, and camera calibrations. These techniques can jointly estimate the above variables benefitting the overall SLAM system while respecting the mechanical relationship between sensors. Moreover, this process is undertaken in an online manner, e.g., performed while the device is being used by the user and the user does not have undergo any special calibration process.

In some implementations, the systems and methods described in this document can be faster than other systems, e.g., can have a shorter convergence time when performing an iterative process. For example, when an online calibration visual inertial bundle adjustment ("OCVIBA") system minimizes one or more residual errors for input values received by the system, as part of an iterative process, the OCVIBA system can determine a result more quickly than other systems, e.g., because of the use of image data, inertial data, camera calibration data, and inertial measurement unit calibration data.

In some implementations, the systems and methods described in this document can enable device calibration based on physical changes to the device configuration without recalibration at a factory, service center, or other specialized location. The physical changes can be caused by temperature changes, e.g., heat or cold, pressure changes, or external sources, e.g., as a user wearing the device turns their head. In some implementations, the systems and methods described in this document can enable device calibration during runtime, e.g., online while the device is capturing images, generating maps, or both. This can enable the device to generate more accurate device location predictions, maps, or both, without undergoing a special calibration process.

In some implementations, the systems described in this document can perform the methods described in this document, e.g., bundle adjustment, for a device that has at least, e.g., only, two sensors. The two sensors can be a camera and another sensor, such as an inertial measurement unit. In some implementations, the systems and methods described in this document can perform a preintegration process without saving inertial measurement unit measurements. The techniques herein can provide a more robust initialization of the system, which can be crucial for the performance of the system. A SLAM system is typically in its most fragile state during this initialization process. Having more sources of data can make the initialization more accurate, faster, and more robust.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
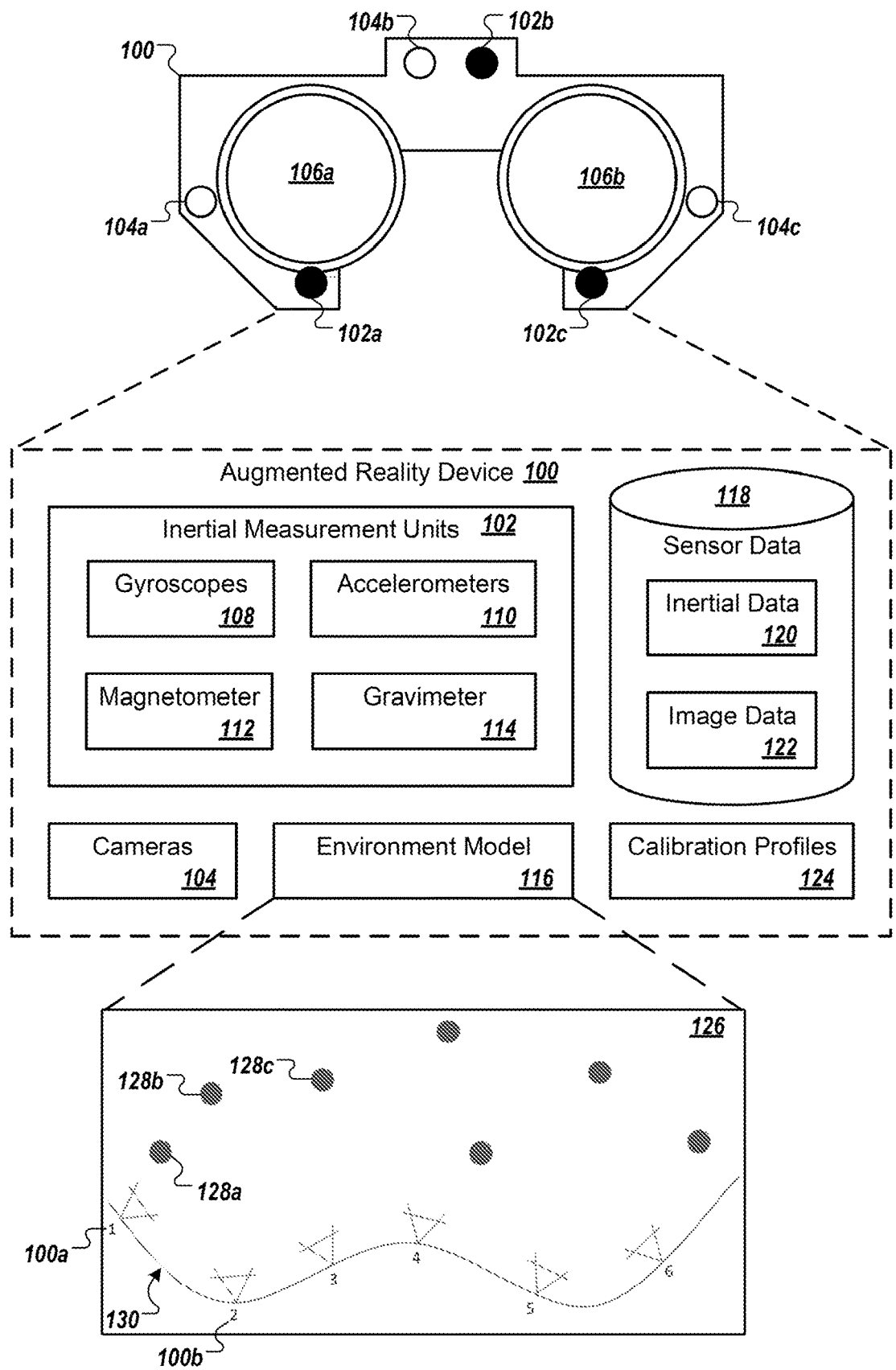
FIG. 1 is an example of an augmented reality device.

FIG. 1 is an example of an augmented reality device 100. The augmented reality device 100 includes multiple inertial measurement units 102a-102c, multiple cameras 104a-104c, and a pair of eyepieces 106a-106b. The augmented reality device 100 uses data from the inertial measurement units 102a-102c and the cameras 104a-104c to present content on the eyepieces 106a-106b. The content can include content that is presented by the eyepieces 106a-106b overlaid on top of the view of the environment 126. For example, the eyepieces 106a-106b can present a picture or information about an area of a city in which the augmented reality device 100 is located. The content can include content about an environment 126 in which the augmented reality device 100 is located.

The augmented reality device 100 can use a visual-inertial variant of the bundle adjustment algorithm in the context of a Simultaneous Localization and Mapping ("SLAM") pipeline. The device 100 uses an algorithm that involves a joint optimization of the user's surroundings (e.g., map points or 3D points), motion trajectory (e.g., poses and velocities of the device 100), and the device sensor calibrations (e.g., intrinsic and extrinsic parameters of the cameras and IMU). This improves on prior systems that are based only on visual information by integrating inertial information in the joint estimation process. This also improves on offline calibration systems which are only able to estimate the visual and inertial sensor calibration information in controlled environments and after the data collection takes place.

The device sensor calibrations can include intrinsic parameters, extrinsic parameters, or both. The augmented reality device can have device sensor calibrations for the cameras, the IMU, or both. Some examples of camera intrinsic parameters can include focal length; principal point, e.g., optical center, coordinates; skew coefficient, e.g., non-zero if the image axes are not perpendicular; scale factor, e.g., equal to one; lens distortion parameters; or a combination of two or more of these. IMU intrinsic parameters can include, e.g., for a gyroscope, an accelerator, or both: constant bias; axes misalignment; temperature bias; temperature scale factor; or a combination of two or more of these. IMU intrinsic parameters for a gyroscope can include acceleration bias, e.g., a gyroscope bias due to accelerations, measured in units of [(rad/s)/(m/s^2)]. Some examples of IMU, camera, or both, calibration extrinsic parameters can include rotation data and translation data that indicate a three-dimensional transformation between i) the particular IMU or camera and ii) a calibration reference point.

The observations used to estimate the parameters of the visual-inertial model of the user's surroundings, motion trajectory, and device sensor calibrations are based on camera images of the environment and inertial measurements of the device's motion. The inertial measurements are obtained via inertial measurement units ("IMUs") which measure, e.g., angular velocity using gyroscopes and linear acceleration using accelerometers. The algorithm then predicts the most likely parameters for the chosen visual-inertial model given these visual and inertial observations and previous parameters obtained from a factory calibration process.

As the augmented reality device 100 moves through the environment 126, sensors included in the augmented reality device 100 generate data. The labels 100a and 100b refer to different positions or situations of the augmented reality device 100. For example, the augmented reality device 100a represents the device 100 at a first location in the environment 126, where the inertial measurement units 102 and the cameras 104, both as the sensors, capture data about the augmented reality device 100a, the environment 126, or both.

The inertial measurement units 102 generate inertial data 120 about the augmented reality device 100a. The inertial data 120 can include one or more of an angular velocity generated by a gyroscope 108, a linear velocity or an acceleration or both generated by an accelerometer 110, a direction generated by a magnetometer 112, e.g., a compass, or a direction of gravity generated by a gravimeter 114. In some implementations, the inertial data 120 can include an estimated position captured by a global positioning system receiver.

The cameras 104 generate image data 122 of the environment. For instance, when at the first location, the cameras 104 can capture image data 122 that depict one or more objects, such as a house and a car. The objects can include points, such as edges, that the augmented reality device 100a identifies as 3D points 128a-128c. The augmented reality device 100a can use the 3D points 128a-128c as reference points in the environment 126. For example, the augmented reality device 100a can use the 3D points 128a-128c to create an environment model 116 of the environment 126, to calibrate the augmented reality device 100a, or both.

When the augmented reality device 100a moves from the first location to a second location, identified by the augmented reality device 100b in FIG. 1, some of the sensors in the augmented reality device 100b can change relative position with respect to other sensors in the augmented reality device 100b. For instance, when the augmented reality device 100 is worn by a user, e.g., on the user's head, the sensors can change position based on the temperature, pressure changes, or external pressure sources, e.g., when a left side of the augmented reality device 100 contacts a wall or a cushion on a couch. These relative position changes can decrease an accuracy of the augmented reality device 100 in generating the environment model 116, determining a position of the augmented reality device 100 in the environment 126, or both.

To improve device accuracy, the augmented reality device 100b can update the environment model 116, or determine a position of the augmented reality device 100b, or both, by determining a relative position of one of the sensors with respect to another sensor using sensor data 118. The sensor data 118 includes inertial data 120 captured by the augmented reality device 100 after the augmented reality device 100b was at the first position. The sensor data 118 includes image data 122 captured by the augmented reality device 100 after the augmented reality device 100b was at the first position. The determination of a relative position of a sensor with respect to another sensor using the sensor data 118, e.g., captured by the augmented reality device 100 after the augmented reality device 100b was at the first position, can enable the augmented reality device 100 recalibration without recalibration at a factory, can enable recalibration during runtime, or both.

As the augmented reality device 100 moves from a first position to a second position, the augmented reality device 100 can capture and analyze sensor data. When the sensor data analysis indicates that one or more existing sensor parameters are incorrect, the augmented reality device 100 can perform a calibration process to correct the sensor parameters. For instance, the augmented reality device 100b can determine while or after being at the second location, that the augmented reality device 100b should calibrate one of the sensors, e.g., the cameras 104. The augmented reality device 100b can perform the determination based on data received during a period of time in which the augmented reality device 100 moved from the first position to the second position.

The augmented reality device 100 can include a processing module that performs the calibration determination using data received from the sensors. For instance, the processing module can communicate with the inertial measurement units 102 and the cameras 104 using a wired connection, a wireless connection, or a combination of both. As the processing module, e.g., a data processing apparatus, receives the sensor data 118, the processing module can store the sensors data 118 in memory, e.g., in a database included in the processing module.

The processing module can perform the calibration determination at any appropriate time. For example, the processing module can determine whether a data threshold has been satisfied. If the threshold has been satisfied, the processing module can determine to check the calibration of the sensors using the received sensor data.

The threshold can be any appropriate type of threshold. The threshold can be a predetermined length of time. The threshold can be a threshold translation, a threshold rotation, or a combination of the two, of the augmented reality device 100. The threshold can be a quantity of data received from the sensors, from one of the sensors, or from some combination of the sensors. For instance, the processing module can determine to check the sensor calibration after receiving ten images from a first camera 104a.

The processing module can be located at any appropriate location on the augmented reality device 100. For instance, the processing module can be located on a frame of the augmented reality device 100, e.g., on the side or back of the device. The processing module can be included in headphones that are part of the augmented reality device. The processing module can be physically separated from a frame that connects to the sensors, e.g., and communicate with the sensors using a wired or wireless connection.

The augmented reality device 100 can determine whether to calibrate one of the sensors using the inertial data 120, the image data 122, or both. For instance, the augmented reality device 100b can compare inertial data for the first position with inertial data for the second position. As part of this comparison, the augmented reality device 100b can compare inertial data received from different inertial measurement units 102a-102c. When inertial data received from different inertial measurement units 102a-102c indicates a change in respective positions between two of the inertial measurement units 102a-102c, the augmented reality device 100b can determine that one or both of the corresponding cameras 104a-104c should be calibrated.

For instance, the processing module can determine that, while the augmented reality device 100a was at the first position, a first inertial measurement unit 102a was located at a first IMU position and a second inertial measurement unit 102b was located at a second IMU position. The processing module can determine that, while the augmented reality device 100b was at the second position, the first inertial measurement unit 102a was located at a third IMU position and the second inertial measurement unit 102b was located at a fourth IMU position. The processing module can use the first position and the second position to determine a relative position between the first inertial measurement unit 102a and the second inertial measurement unit 102b while the augmented reality device 100a was at the first position, e.g., 5.2 inches. The processing module can use the third position and the fourth position to determine a relative position between the first inertial measurement unit 102a and the second inertial measurement unit 102b while the augmented reality device 100b was at the second position, e.g., 5.1 inches. In this example, the relative position between the first inertial measurement unit 102a and the second inertial measurement unit 102b changed by 0.1 inches.

The processing module can compare any change in the relative positions with a calibration threshold. When the change satisfies the calibration threshold, e.g., is greater than or equal to or either, the processing module can determine to calibrate one of the sensors. When the change does not satisfy the calibration threshold, e.g., is less than or equal to or wither, the processing module can determine to skip calibration of either of the sensors.

When the change in the respective positions between the two inertial measurement units 102a-102c does not satisfy a calibration threshold, the augmented reality device 100b determines to skip calibration based on the two inertial measurement units 102a-102c. The augmented reality device 100b can compare the calibration threshold with an amount of deformation, e.g., a change between a factory separation or from a prior separation, for the two inertial measurement units. In some examples, the augmented reality device 100b can compare the calibration threshold to a value that is the inverse of the amount of deformation. When the amount of deformation includes multiple values, e.g., is a matrix, the augmented reality device 100b can compare the calibration threshold with an average, a minimum, a maximum, or multiple values separately, e.g., the calibration threshold can be a matrix of with the same size as the amount of deformation. The augmented reality device 100b can perform this calibration determination for each pair of inertial measurement units 102a-102c separately, or for pairs that include a reference inertial measurement unit, e.g., the middle inertial measurement unit 102b, and another inertial measurement unit 102a-102c.

When the change in the respective positions between the two inertial measurement units 102a-102c satisfies the calibration threshold, the augmented reality device 100b determines to calibrate one of the cameras 104a-104c. The calibration threshold can represent a level of accuracy of a calibration profile 124 for one of the cameras 104a-104c that corresponds with the two inertial measurement units 102a-102c. For example, the augmented reality device 100 includes pairs of cameras and inertial measurement units: a left inertial measurement unit 102a and a left camera 104a; a middle inertial measurement unit 102b and a middle camera 104b; and a right inertial measurement unit 102c and a right camera 104c. When the augmented reality device 100b determines that the change in the respective positions between the left IMU 102*a* and the middle IMU 102*b* satisfies the calibration threshold, the augmented reality device 100*b* can determine to update a calibration profile for either the left camera 104*a* or the middle camera 104*b* or both. When the middle camera 104*b* is a reference camera, e.g., that does not have relative position data in a calibration profile 124, the augmented reality device 100*b* can determine to calibrate the left camera 104*a*.

In some implementations, the augmented reality device 100*b* can determine whether to calibrate a camera by comparing calibration data for the inertial measurement unit that corresponds with the camera with a calibration threshold. For instance, the augmented reality device 100*b* can determine a predicted relative position for a camera using the predicted relative position for the inertial measurement unit that is physically closest to the camera. The augmented reality device 100*b* can compare i) a predicted relative position for the left camera 104*a* with respect to the right camera 104*c* with ii) a stored relative position for the left camera 104*a* with respect to the right camera 104*c*. When the difference between the predicted relative position and the stored relative position satisfies, e.g., is greater than or equal to or either, the calibration threshold, the augmented reality device 100*b* can determine to calibrate one of the cameras.

To calibrate one of the cameras 104*a*-104*c*, the augmented reality device 100*b* can update the calibration profile 124 for the camera 104*a*-104*c*. The calibration profile 124 can include data that indicates a relative position for the camera 104*a*-104*c* with respect to another camera, e.g., based on a factory calibration, constraints regarding the spacing and orientation for the camera, or both. The calibration profile 124 can include a stored relative position, e.g., that was previously determined as a predicted relative position for the camera. The calibration profile 124 can include, for a particular camera, relative positions between the particular camera and one other camera, e.g., a reference camera, or all other cameras. For instance, the calibration profile 124 can include a relative position for the left camera 104*a* with respect to the center camera 104*b*. In some examples, the calibration profile can include a first relative position for the left camera 104*a* with respect to the center camera 104*b* and a second relative position for the left camera 104*a* with respect to the right camera 104*c*. Use of multiple relative positions can enable the augmented reality device 100 to more accurately determine the relative positions of each of the cameras 104*a*-104*c*, e.g., by ensuring that the relative positions for each of the cameras aligns with the other relative positions.

When the augmented reality device 100*b* updates the calibration profile 124 for the camera 104*a*-104*c*, the augmented reality device 100*b* adds or updates a predicted relative position for the camera 104*a*-104*c* with respect to the other camera to the calibration profile 124. The augmented reality device 100*b* can remove any prior calibration data or keep prior calibration data in the calibration profile, e.g., when the prior calibration data is a factory calibration.

The relative position, the predicted relative position, or both, can include translation data and rotation data, e.g., calibrated translation data and calibrated rotation data. The relative positions can be based on a center point of each sensor, e.g., a center of the respective camera 104*a*-104*c* a center of a corresponding inertial measurement unit, or both. The translation data can include a single value, e.g., x, that indicates a distance between the two cameras. The translation data can include multiple values, e.g., a 3×1 vector or a translation vector. The rotation data can include three values or a vector, e.g., x and y and z, that indicate a relative angular orientation between the two cameras. The rotation data can include a matrix, e.g., a 3×3 matrix or a rotation matrix.

After updating the calibration profile 124, the augmented reality device 100*b* can determine a more accurate trajectory 130 for the augmented reality device 100 as the augmented reality device 100 moves through the environment compared to a trajectory if the augmented reality device 100*b* had not updated the calibration profile 124. For instance, as the augmented reality device 100*b* moves through the environment 126, the augmented reality device 100 can determine the trajectory or path the device takes through the environment 126. The augmented reality device 100 uses the locations of the cameras 104*a*-104*c*, and the images captured by the cameras 104*a*-104*c*, to determine the trajectory.

As the relative positions of the cameras changes over time from factory-calibrated positions, the augmented reality device's 100 determined trajectory becomes inaccurate if these changes are not accounted for. For example, if the left camera 104*a* becomes lower with respect to the right camera 104*c* than the initial factory configuration, then the trajectory may indicate that the augmented reality device 100 is higher than it actually is. This can cause the augmented reality device 100 to generate incorrect output, e.g., for presentation on the eyepieces 106*a*-106*b*, such as by overlaying a generated image on the wrong portion of the environment 126. This could cause the overlaid image to appear to move with respect to the environment 126 when the overlaid image is supposed to remain at the same position with respect to the environment 126 as the augmented reality device 100 moves.

By checking the calibration of the cameras 104, and updating corresponding calibration profiles 124 when appropriate, the augmented reality device 100 is able to account for these trajectory changes. This can enable the augmented reality device 100 to more accurately determine its trajectory, generate more accurate environment models 116, or both.

In some implementations, the augmented reality device 100 can use the calibration profiles 124 when generating the environment model 116 of the environment 126. The environment model 116 can include 3D points 128*a*-128*c* and other data that represents the environment 126. The augmented reality device 100 can update the environment model 116 as the sensors capture additional data about the environment 126 and the augmented reality device 100 moves though the environment 126. The augmented reality device 100 can use the environment model 116 to identify objects in the environment 126, present information about the objects in the environment 126, e.g., driving directions, to overlay images onto the environment, e.g., using the eyepieces 106*a*-106*b*, or some combination of these.

Although this document refers to the augmented reality device 100, the systems and methods described in this document can apply to other devices and other systems, e.g., other computer vision systems, that include at least one inertial measurement unit 102 and at least one camera 104. For instance, a robot with stereo cameras or a virtual device, e.g., for an environment with a realistic physics model of the virtual device, can use the systems and methods described in this document. Although some examples described in this document refer to stereo cameras, various embodiments can be implemented on a system that includes a single camera and another sensor, such as an IMU or a global positioning system sensor.

In some implementations, the environment 126 is a physical environment. For example, the environment can include houses, trees, automobiles, and other physical objects captured by the cameras 104 in multiple images and around which the augmented reality device 100 can move.

Figure 2:
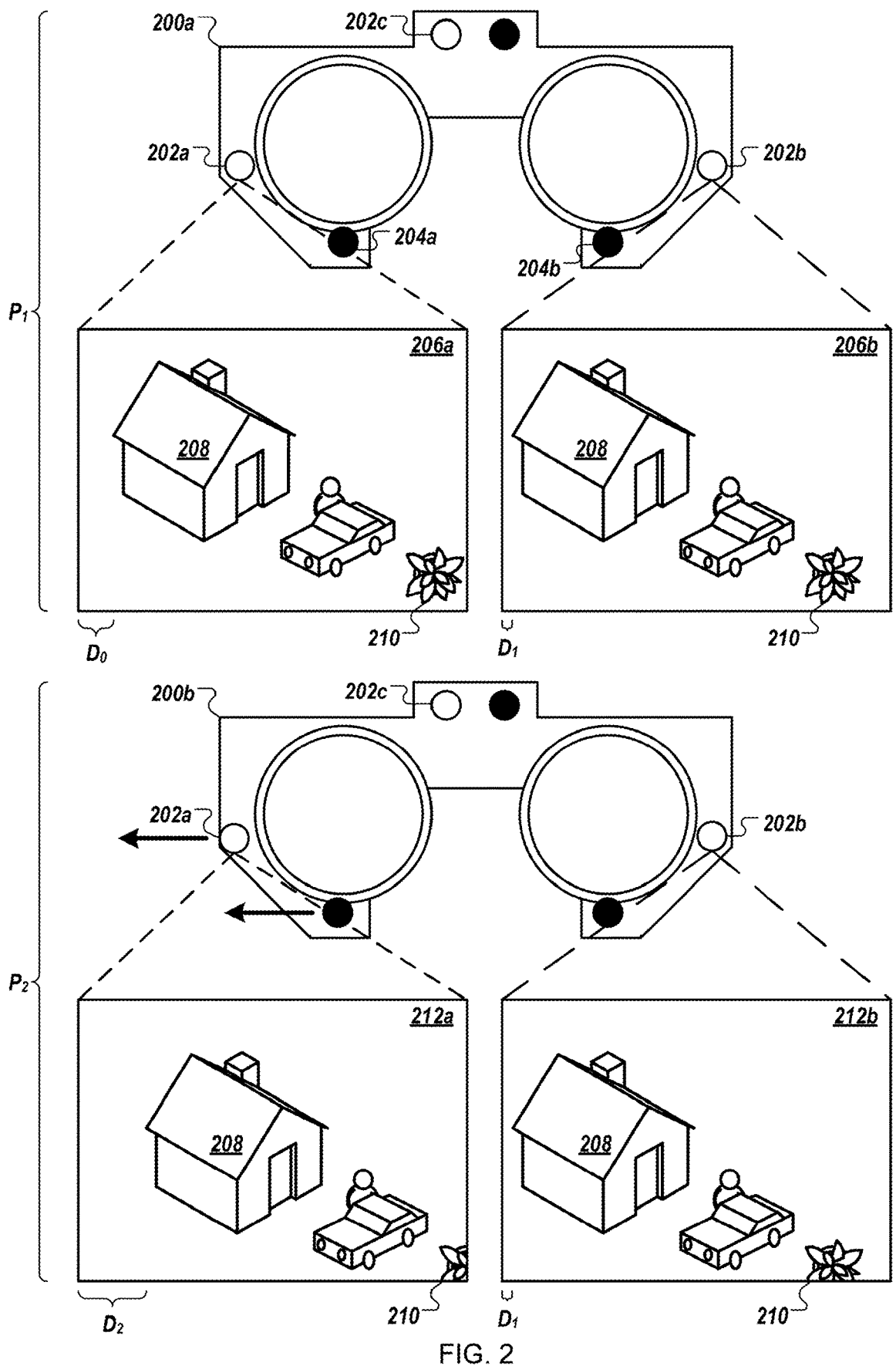
FIG. 2 depicts a series of image pairs captured by a device over time.

FIG. 2 depicts a series of image pairs 206a-b, 212a-b, captured by a device 200a-b over time. For example, the device 200a-b can be the augmented reality device 100 described above with reference to FIG. 1. The device 200a-b includes a first camera 202a and a second camera 202b.

The device 200a captures, at a first position $P_1$, a first image pair 206a-b using the cameras 202a-b, respectively. The first image pair 206a-b includes a first left image 206a and a first right image 206b that each depict a portion of an environment in which the device is located, e.g., the environment 126. For example, the first image pair 206a-b depicts a house 208, a person standing by a car, and a bush 210.

Because the device 200a includes stereo cameras 202a-b, the first image pair 206a-b are stereo images, e.g., one image is offset from the other image. When presented together, one image for each of a person's eyes, the first image pair 206a-b can create a virtual three-dimensional image since one image is offset from the other image. Here, the left image 206a depicts more space between the house 208 and the left side of the left image 206a, at a distance $D_0$, compared to the right image 206b that has less space between the house 208 and the left side of the right image 206b, at a smaller distance $D_1$ that is less than the distance $D_0$.

The device 200b captures, at a second position $P_2$, a second image pair 212a-b using the cameras 202a-b, respectively. The second position $P_2$ is a different position from the first position $P_1$. The device 200b captures the second image pair 212a-b at a different time from the capture of the first image pair 206a-b, e.g., after capturing the first image pair 206a-b.

Because the device 200b moved from the first position $P_1$ to the second position $P_2$, the location of the house 208 and the bush 210, along with the person and the car, changed for each of the respective images. For instance, the change in position for the device 200b can be caused by movement of the cameras 202a-b up. The cameras 202a-b can move vertically upward, rotate in an upward direction, or a combination of both, to cause the change from the first position $P_1$ to the second position $P_2$. This upward movement results in the cameras 202a-b capturing the second image pair 212a-b that depict the house 208 and the bush 210 at lower locations in the respective images compared to the locations of the house 208 and the bush 210 in the first image pair 206a-b.

The second left image 212a also depicts the house 208 further away from a left side of the second left image 212a, at a distance $D_2$, than the location at which the house is depicted in the first left image 206a, at a distance $D_0$ from the left side of the first left image. Further, the second left image 212a depicts the bush 210 with both a bottom portion and a right side portion cut out of the second left image 212a, when the second left image 212a should include the right side portion of the bush 210 given that the device's 200b view should have only changed in the vertical direction.

This discrepancy in the images can be caused by the left camera 202a being closer to an edge of the device 200b when the device 200b is at the second position $P_2$ compared to the location of the left camera 202a when the device 200a was at the first position $P_1$. For instance, the left side of the camera 202b can be in the sun, while the right side of the camera 202b can be in the shade. The heat on one side of the camera 202b can cause the camera 202b to deform, moving the location of the left camera 202a over time, e.g., as the camera 202b expands.

When the device 200b uses the first image pair 206a-b and the second image pair 212a-b to determine a trajectory of the device 200b from the first position $P_1$ to the second position $P_2$, the device 200b can also use inertial data captured by multiple inertial measurement units 204a-b to account for the change in the position of the left camera 202a. For instance, the device 200b can use inertial data from the inertial measurement units 204a-b to update a calibration profile for the left camera 202a. The device 200b can use the updated calibration profile, with the two image pairs 206a-b, 212a-b, to determine the trajectory of the device 200b from the first position $P_1$ to the second position $P_2$.

The device 200b can use data from any appropriate camera, inertial measurement unit, or both, to correct for changes in the cameras. For instance, the device 200b can use image data and inertial data from a center camera 202c, at the top center of the device 200b, and a corresponding inertial measurement unit to update the calibration profile for the left camera 202a. The device 200b can use the center camera 202c as a reference camera with which the device 200b determines whether and how to update calibration profiles for the other cameras 202a-b.

Figure 3:
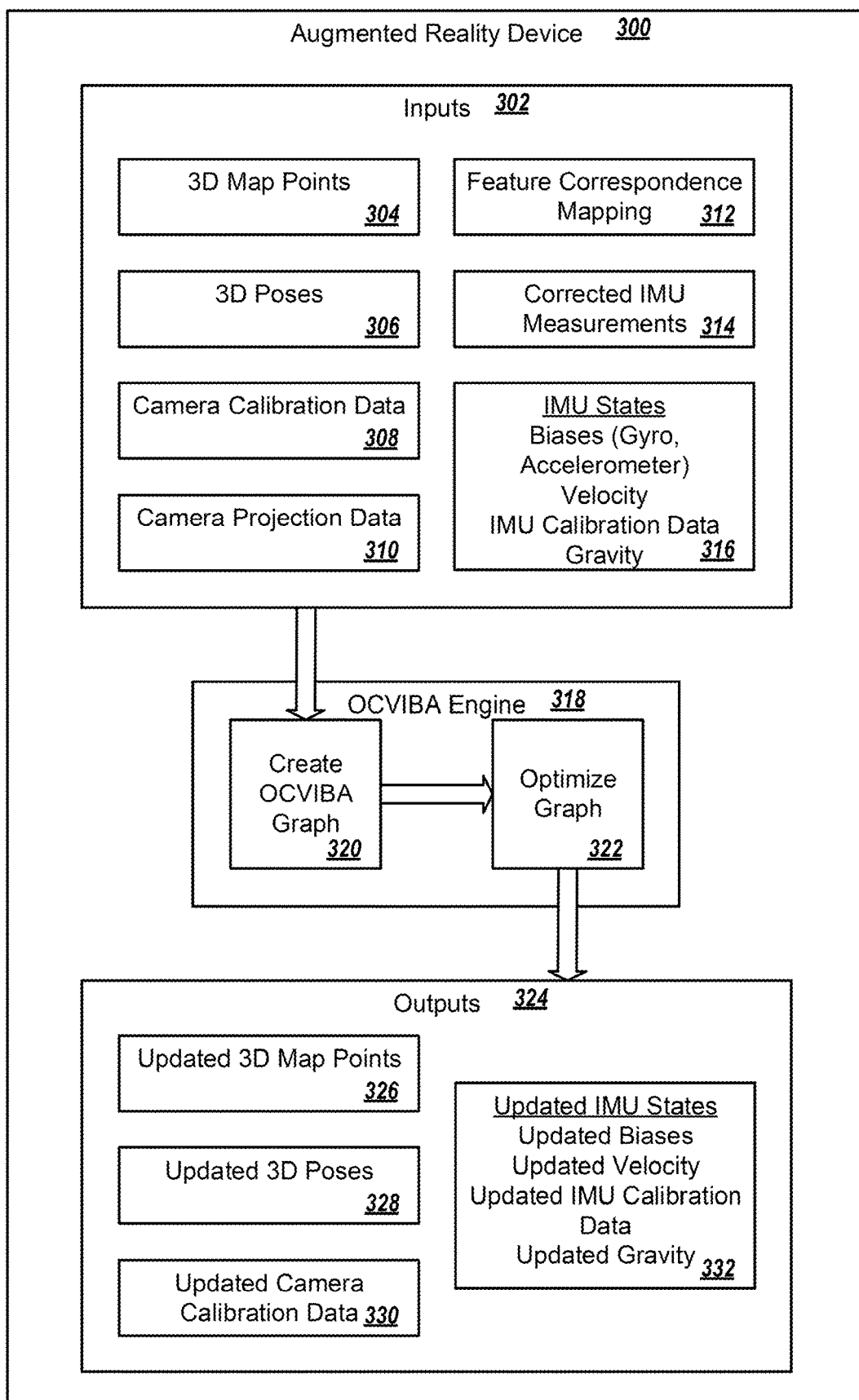
FIG. 3 depicts an example augmented reality device with an online calibration visual inertial bundle adjustment ("OCVIBA") engine.

FIG. 3 depicts an example augmented reality device 300 with an online calibration visual inertial bundle adjustment ("OCVIBA") engine 318. The augmented reality device 300 can provide multiple input values 302 to the OCVIBA engine 318 to cause the OCVIBA engine 318 to generate multiple output values 324. At least some of the output values 324 can be refinements or updates to corresponding input values 302.

For example, the augmented reality device 300 can include a simultaneous localization and mapping ("SLAM") engine that generates an environment model of an environment in which the augmented reality device 300 is located. The SLAM engine can determine initial three-dimensional map points 304 that represents points in the environment. The three-dimensional map points 304 can have estimated locations within a three-dimensional environment that correspond to the location of the points in the environment. For instance, the SLAM engine can determine, using images of the environment captured by one or more cameras, the point that represents an object, such as a plant, located in the environment. The SLAM engine can then calculate an estimated location in the environment model, e.g., a three-dimensional model, that corresponds to the location of the point in the environment.

The augmented reality device 300 can perform the SLAM process periodically. For instance, the augmented reality device 300 can perform the SLAM process for every key frame in a sequence of images captured by a camera, or periodically based on data received from another sensor in the augmented reality device.

A key frame can be an image from a sequence of images captured by a camera in the augmented reality device 300. For instance, a key frame can be every $n^{th}$ image, e.g., every fourth image, in a sequence of images captured by the camera. The augmented reality device 300 can provide data for every key frame, rather than every image, to the OCVIBA engine 318 based on the computational resources available to the OCVIBA engine 318, to reduce memory usage or processor usage, or a combination of both.

The augmented reality device 300 can receive, from an IMU, an IMU measurement every $i^{th}$ time interval. This time interval can be less than the time interval between images captured in the sequence of images by a camera. For instance, the IMU can calculate IMU measurements every $i^{th}$ time interval while a camera can capture an image every $m*i$ time interval, e.g., every $4*i$ time intervals.

The augmented reality device 300 can generate, e.g., as part of a SLAM process, the input values 302 using the IMU measurements and the images. The augmented reality device 300 can determine, e.g., as part of the SLAM process, an initial trajectory estimate for the augmented reality device 300.

For example, the SLAM engine can determine initial three-dimensional poses 306 that indicate a predicted three-dimensional position, three-dimensional orientation, or both, of the augmented reality device 300 in the environment model. The SLAM engine can determine the initial three-dimensional poses 306 using the images, inertial data, and other data captured by sensors included in the augmented reality device 300. The SLAM engine can calculate the three-dimensional position, the three-dimensional orientation, or both, based on a reference point in the environment model. The SLAM engine can use, as the reference point, an initial position of the augmented reality device 300 in the environment model, e.g., based on when the augmented reality device 300 was turned on. The SLAM engine can use any appropriate reference point, e.g., a reference point based on another location at which the augmented reality device 300 captured an image, inertial data, or both.

The augmented reality device 300 can store, in memory, camera calibration data 308, e.g., camera extrinsic parameters, camera projection data 310, e.g., camera intrinsic parameters, or both. The camera calibration data 308 can include, for a particular camera, rotation data and translation data that indicate a three-dimensional transformation between the particular camera and a calibration reference point for the augmented reality device 300. The calibration reference point can be a point on the augmented reality device 300 or another sensor. The other sensor can be another camera, an inertial measurement unit, a global positioning system sensor, or another appropriate type of sensor. The rotation data can indicate a rotation in degrees between a reference for the particular camera, e.g., a reference surface such as a front surface, and a reference for the other sensor, e.g., a reference surface such as a front surface. The translation data can indicate a distance between a reference point for the particular camera and a reference point for the other sensor. For instance, the translation data can indicate a distance between a center of the particular camera and a center of the other sensor. The calibration data can, for example, be between a first camera and a second camera; a camera and an inertial measurement unit; or a camera and a rig for the augmented reality device 300, e.g., a reference point on the rig.

The camera projection data 310 can specify a projection from world points in the environment to pixel coordinates in the environment model. For instance, the camera projection data 310 can include one or more distortion coefficients, a camera matrix, a camera resolution, or a combination of these. The camera projection data 310 can indicate parameters for a camera that are fixed in contrast to the camera calibration data 308 which can be updated, e.g., based on changes to the camera, the augmented reality device 300, the environment, or a combination of two or more of these. The distortion coefficients can include a tangential distortion coefficient, a radial coefficient, or both. The camera matrix can include a principal point, e.g., in x-y coordinates, a focal length, e.g., in x-y coordinates, or both. The camera resolution can include a width and a height.

The augmented reality device 300 can store, in memory, a feature correspondence mapping 312. The feature correspondence mapping 312 can be a mapping that associates two-dimensional features from images with corresponding three-dimensional points in the environment model. For instance, the feature correspondence mapping 312 can include an entry that identifies a two-dimensional feature and the three-dimensional point in the environment model that represents all or part of the two-dimensional feature. In some examples, an entry in the feature correspondence mapping 312 can identify multiple two-dimensional features that correspond to the same three-dimensional point. For instance, when multiple images depict an object from the environment, the augmented reality device 300 can store an entry in the feature correspondence mapping 312 that identifies data for each of the multiple images and the three-dimensional point in the environment model that represents at least part of the object.

The feature correspondence mapping 312 identifies a two-dimensional point depict in an image that corresponds to a three-dimensional point in the environment model, e.g., one of the three-dimensional map points 304. The camera calibration data 308 and the camera projection data 310 indicate how the two-dimensional point corresponds to the three-dimensional point. In some examples, the camera calibration data 308 and the camera projection data 310 indicate how the augmented reality device 300 determines the three-dimensional point that corresponds to the two-dimensional point.

When multiple two-dimensional points correspond to the same three-dimensional point, e.g., each two-dimensional point is for an image captured by a different camera, a single camera at different times, or both, the augmented reality device 300 might determine different locations in the environment model for the three-dimensional point given the different two-dimensional points, e.g., the different images. To account for this error, the OCVIBA engine 318 can adjust camera calibration data 308, three-dimensional poses 306 at which the images were captured, or both, so that projections from the two-dimensional points to the corresponding three-dimensional point are more likely to represent the environment. The adjustments to the camera calibration data 308 can be adjustments for calibration data for a single camera during different time periods, for different cameras during the same time period, for different cameras during different time periods, or a combination of two or more of these. The three-dimensional poses 306 can include a single pose at which multiple cameras captured separate images, or multiple poses. This adjustment process is described in more detail below with reference to the OCVIBA engine 318.

The augmented reality device 300 can store, in memory, one or more corrected IMU measurements 314, e.g., corrected inertial data. IMU measurements can include an angular velocity, a linear acceleration, a heading given by a magnetic field, e.g., measured by a magnetometer, or a combination of these. For instance, the IMU measurements can include an angular velocity and a linear acceleration. To account for external forces that act on an inertial measurement unit, inaccuracies in an inertial measurement unit, or both, the augmented reality device 300 can correct captured IMU measurements to generate the corrected IMU measurements 314. The corrected IMU measurements 314 can include a corrected angular velocity, a corrected linear acceleration, a corrected heading, or a combination of two or more of these. For instance, the corrected IMU measurements 314 can include a corrected angular velocity and a corrected linear acceleration.

The augmented reality device 300 can remove, e.g., subtract, gravity from a linear acceleration to determine a corrected linear acceleration. The corrected linear acceleration can indicate an acceleration of the IMU that captured data for the linear acceleration, the augmented reality device 300, or both. The augmented reality device 300 can determine the corrected linear acceleration that indicates an acceleration of the IMU separate from the downward force of gravity on the IMU. The augmented reality device 300 can remove a stationary angular velocity from a measured angular velocity to determine the corrected angular velocity. The stationary angular velocity can be an angular velocity measured by an inertial measurement unit when the inertial measurement unit is substantially stationary, e.g., resting on a surface.

The augmented reality device 300 can store, in memory, IMU state data 316. The IMU state data 316 can include biases, velocity, IMU calibration data, gravity data, or a combination of these. The IMU state data 316 can include state data for a single IMU, e.g., when the augmented reality device 300 includes only one IMU, or multiple IMUs.

The biases can account for inaccuracies in measurements by an IMU. For instance, the augmented reality device 300 can determine measurements made by the IMU when the IMU is in a substantially stationary position, e.g., sitting on a desk. These measurements can indicate, for instance, movement of the IMU, forces on the IMU that are not accounted for by gravity, or other measurements by the IMU. These measurements can be caused by an increased temperature for the IMU, the augmented reality device 300, or both; or natural magnetic nuances, to name a few examples. The augmented reality device 300 can determine the biases so that the acceleration, velocity, or both, of an IMU are approximately zero. For example, when the augmented reality device 300 determines that an IMU is experiencing a downward force of 10 meters per second squared, the augmented reality device 300 can calculate a bias of 0.19335 given a gravity value of 9.80665 meters per second squared. The biases can include one or more gyroscope biases $b^g(t)$, one or more accelerometer biases $b^a(t)$, or a combination of both.

The IMU state data 316 can include a velocity for an IMU, e.g., a velocity for each IMU in the augmented reality device 300. The velocity can include rotational velocity data, linear velocity data, or both. For instance, the IMU state data 316 can include a linear velocity for an IMU. The linear velocity in the IMU state data 316 can be a linear velocity of an IMU represented in the physical world coordinate system. This can allow the augmented reality device 300 to calculate a smooth transition of the linear velocity across time intervals. The velocity can indicate a speed and a direction of the IMU, if any. When the IMU does not have a speed and a direction, the velocity can have values of zero for both, e.g., a non-negative real number that indicates the IMU's speed and a three-dimensional vector that indicates the IMU's direction based on a reference point.

In some implementations, the corrected IMU measurements 314 can be based off of IMU measurements that would otherwise be included in the IMU state data 316 except that those IMU measurements that are corrected might not completely accurately represent an IMU state without correction. For instance, the IMU state data 316 can include a measured linear acceleration. Because the measured linear acceleration includes measurements for forces that include gravity, the augmented reality device 300 can generate a corrected linear acceleration to remove forces caused by gravity from the linear acceleration value. The velocity in the IMU state data 316 is a linear velocity of the IMU represented in the world coordinate system. This allows a smooth transition of the velocity between intervals. The corrected IMU measurements can provide a corrected angular velocity and corrected linear acceleration.

The IMU state data 316 can include IMU calibration data. The IMU calibration data can be similar to the camera calibration data 308 described above. For instance, the IMU calibration data, e.g., IMU extrinsic parameters, can include, for a particular IMU, rotation data and translation data that indicate a three-dimensional transformation between the particular IMU and a calibration reference point for the augmented reality device 300. The calibration reference point can be the same calibration reference point as that used for the camera calibration data or a different calibration reference point. For instance, when the augmented reality device 300 includes three cameras, the calibration reference point for the camera calibration data 308 and the IMU calibration data can be a center camera of the three cameras. In this example, the augmented reality device 300 can include camera calibration data for two cameras, e.g., the left and right cameras, and IMU calibration data for any IMUs in the augmented reality device. The augmented reality device 300 might not include any camera calibration data 308 for the central camera that is the calibration reference point. In some examples, when the calibration reference points are different, a camera can have a first calibration reference point that is an IMU and an IMU can have a second calibration reference point that is a camera. In these examples, some of the calibration data for a camera and an IMU can be the same, e.g., have the same values or be the same data.

The IMU state data 316 can include an estimated gravitational acceleration. The augmented reality device 300 can determine the estimated gravitational acceleration based on an area in which the augmented reality device 300 is located. For instance, different areas on a planet, e.g., Earth, can have different gravitational accelerations. The gravitational acceleration can change based on a distance from the equator or the poles, e.g., 9.7803 m/s$^2$ at the equator and 9.8322 m/s$^2$ at the poles. The gravity value can change based on a distance from sea level, e.g., above or below sea level. For instance, Mount Huascarán in Peru at an elevation of 6,768 m can have a gravitational acceleration of 9.7639 m/s$^2$ while some portions of the surface of the Arctic Ocean can have a gravitational acceleration of 9.8337 m/s$^2$.

Given that the augmented reality device 300 can physically change shape over time, as discussed above, these changes in shape can reduce the accuracy of map point calculations, pose calculations, or both. This reduced accuracy can cause jitter, drift, or both, in calculations by the augmented reality device 300, when the calibration data for the cameras, the IMUs, or both, does not accurately represent the physical configuration of the augmented reality device. For instance, deformations in a transformation between a rig of the augmented reality device 300 and a camera can be greater than deformations in a transformation between the rig and an IMU or another reference sensor. To reduce the impact of the deformations between the rig and the camera, the augmented reality device 300 can use predicted deformations between the rig and the reference sensor. This can enable the augmented reality device 300 to calculate more accurate mapping data, such as an updated estimated position, an updated environment model, a device trajectory, or a combination of two or more of these. In some implementations, the reference position with respect to which calibration data is determined may not be a sensor, but another point, such as a point on the frame of the device 300.

To reduce an impact of the deformations on the calibration data, improve an accuracy of the augmented reality device 300 when calculating map points, updates to an environment map, poses, or a combination of these, the augmented reality device 300 can jointly determine updated camera calibration data 330 and updated IMU calibration data, as part of updated IMU state data 332, along with updated three-dimensional map points 326, updated three-dimensional poses 328, an updated environment map, or a combination of these. As part of the joint determination, the augmented reality device 300 can estimate an updated trajectory, e.g., given a combination of poses, updated camera projection data. The augmented reality device can use image data and inertial data during this joint determination, e.g., to leverage the rigidity of the respective visual-inertial sensor boards. For instance, the augmented reality device 300 can use a relationship between the various sensors, and the corresponding calibration data to improve an accuracy of the calculations made by the augmented reality device, e.g., that the calibration data between the rig and an IMU can be found by applying the calibration data between the rig and a camera and the calibration data between the camera and the IMU.

After the augmented reality device 300 receives sensor data from multiple sensors, e.g., at least one camera and at least one IMU, the augmented reality device 300 maintains at least some of the sensor data in memory. For instance, the augmented reality device 300 maintains image data and inertial data in memory.

The augmented reality device 300 provides at least some of the input values 302 to the OCVIBA engine 318. For example, the augmented reality device 300 provides the image data, the inertial, the camera calibration data 308, the camera projection data 310, the corrected IMU measurements 314, e.g., corrected inertial data, and the IMU state data 316 to the OCVIBA engine 318. The augmented reality device 300 can provide one or more of the three-dimensional map points 304, the three-dimensional poses 306, and the feature correspondence mapping 312 to the OCVIBA engine 318.

Some prior systems have difficulty determining updated three-dimensional poses 328, augmented reality device 300 trajectories based on the poses, or both. For instance, some prior systems determine inaccurate updated three-dimensional poses, inaccurate device trajectories, or both. To improve an accuracy of estimated updated three-dimensional poses 328, augmented reality device 300 trajectories, or both, the OCVIBA engine 318 uses both the camera calibration data 308 and the IMU calibration data and can generate updated values for both as part of an OCVIBA process.

A device trajectory can be a combination of one or more poses and one or more velocities. A pose can be an estimated location of the augmented reality device 300 within the environment model such that the estimated location represents a location of the augmented reality device 300 in the real world, e.g., the portion of the environment represented by the environment model. The pose can represent the real world location at which the augmented reality device 300 captured sensor data that the augmented reality device 300 uses to determine the corresponding estimated location in the environment model. The pose can include coordinates, e.g., x-y-z coordinates. The pose can include a direction, e.g., in which the augmented reality device 300 was facing, based on a reference direction, at the time the sensor data was captured.

The velocities, included in a device trajectory, can be estimated velocities of the augmented reality device 300 as the augmented reality device 300 moves between two real world locations each of which are represented by a separate pose. For instance, for a given pair of poses and a time taken by the augmented reality device 300 to move between the two poses, the augmented reality device 300 can determine a corresponding velocity.

The OCVIBA engine 318 can perform an optimization process using the input values to generate output values 324. The output values can be updated three-dimensional map points 326, e.g., refined three-dimensional map points 326 given the three-dimensional map points 304; updated three-dimensional poses, e.g., refined three-dimensional poses 328 given the three-dimensional poses 306; updated camera calibration data 330, e.g., refined camera calibration data given the camera calibration data 308; updated IMU state data 332, e.g., refined IMU state data given the IMU state data 316; or a combination of these. The updated IMU state data 332 can have similar data to the IMU state data 316.

The OCVIBA engine 318 can perform a bundle adjustment process, as described in more detail below. The bundle adjustment process can be a non-linear optimization of estimated states constrained by sensor measurements and factory calibration constraints. The OCVIBA engine 318 can generate output values 324, given the input values 302, most likely estimated states. The most likely estimated states can include an environment model, or an updated environment model; a trajectory for the augmented reality device 300; calibration data, for a camera, an IMU, or both; or a combination of these.

Figure 4:
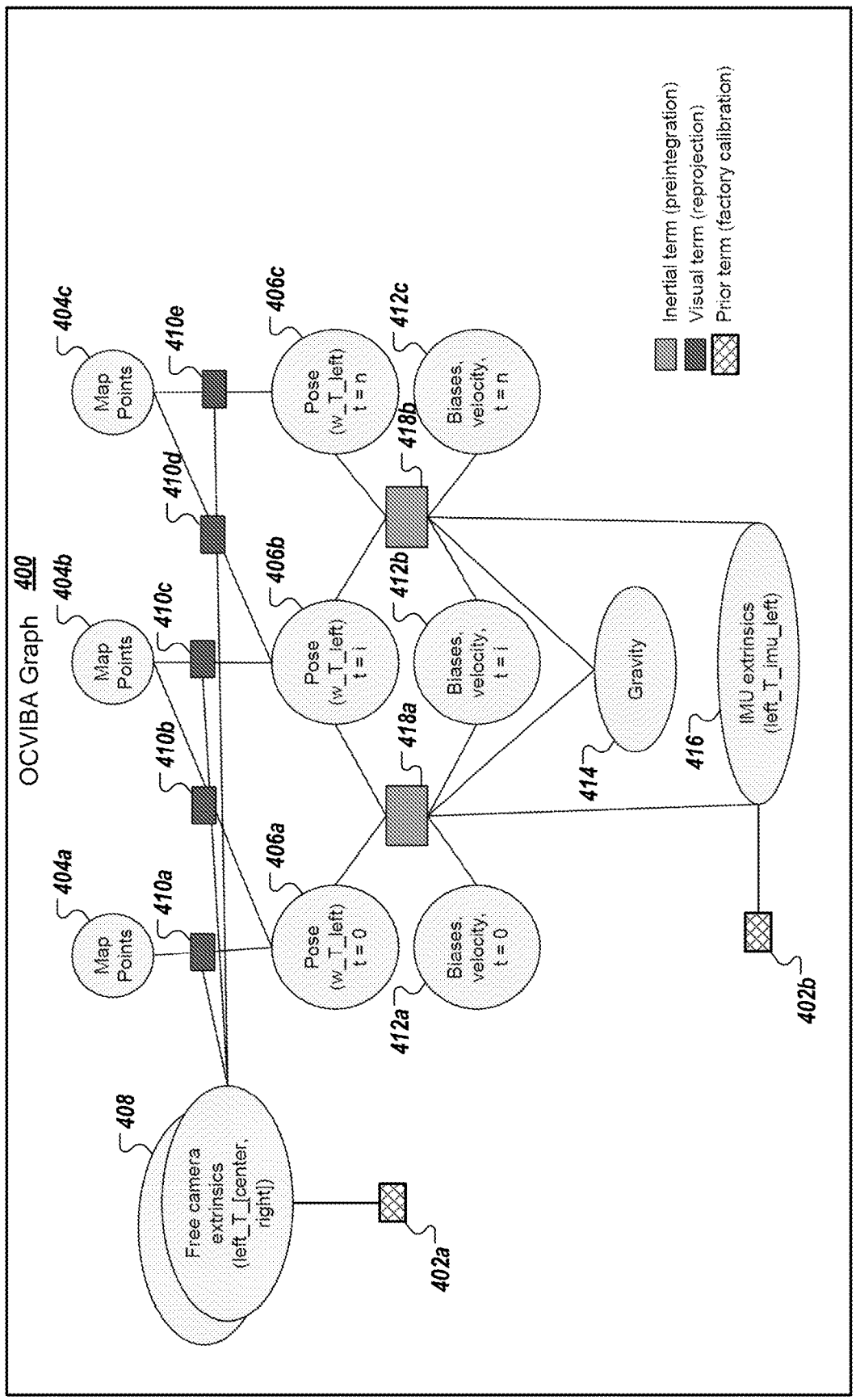
FIG. 4 depicts an example OCVIBA graph with vertices and edges.

As part of the bundle adjustment process, the OCVIBA engine 318 can create a graph 320 using the received input values 302. FIG. 4 depicts an example OCVIBA graph 400 with vertices and edges. The vertices can each represent a parameter for the OCVIBA engine 318 to optimize. The inertial edges, e.g., the edges connected to the inertial data 418, can each represent preintegration edges between consecutive key frames.

The OCVIBA graph 400 can have vertices for map points 404*a-b*, poses 406*a-c*, and camera calibration data 408 that correspond to the input values 302 of the three-dimensional map points 304, the three-dimensional poses 306, and the camera calibration data 308, respectively. The map points 404*a-b*, poses 406*a-c*, and the camera calibration data 408 can be connected to vertices for image data 410*a-e*, e.g., the feature correspondence mapping 312, the corrected IMU measurements 314, or both.

The OCVIBA graph 400 can have vertices for biases and velocity 412*a-c*, gravity 414, and IMU calibration data 416 which correspond to inputs from the IMU state data 316, e.g., the biases, velocity, gravity, and IMU calibration data, respectively.

In some implementations, the OCVIBA graph 400 can have more or fewer vertices. For instance, the OCVIBA graph 400 can have separate vertices for biases and velocity, e.g., first vertices for biases and second vertices for velocity.

As part of the graph creation process, the OCVIBA engine 318 can propagate covariance values through the OCVIBA graph 400. The OCVIBA engine 318 can perform the covariance value propagation using the corrected IMU measurements 314, e.g., between consecutive key frames. The covariance values can indicate a correlation between the vertices in the OCVIBA graph 400. During the bundle adjustment process, the OCVIBA engine 318 can update one or more of the covariance values based on a relationship between input values. For instance, when a first graph parameter and a second graph parameter initially have a high covariance and the OCVIBA engine 318 updates one or both of the first parameter and the second parameter, the OCVIBA engine 318 can determine an updated covariance for the two parameters. The updated covariance value can indicate a correlation between the two parameters, at least one of which has been updated. During bundle adjustment, when the OCVIBA engine 318 updates parameter values, the OCVIBA engine 318 can update parameters to reduce corresponding covariance values. The covariance values can be covariance matrices.

As part of the graph creation process, the OCVIBA engine 318 can propagate Jacobians through the OCVIBA graph 400. The OCVIBA engine 318 can perform the Jacobians propagation using the corrected IMU measurements 314, e.g., between consecutive key frames. The Jacobians can indicate how much a change to one or more of the parameters will change a residual error for the OCVIBA graph 400. In some examples, the OCVIBA engine 318 can use the Jacobians to determine how changes in the parameters affect the velocity, e.g., the IMU state data 316, 332 velocity; the poses, e.g., the poses 306 or 328; or both. During bundle adjustment, when the OCVIBA engine 318 updates parameter values, the OCVIBA engine 318 can update parameters using the Jacobians.

The OCVIBA engine 318 can use one or more penalty functions to determine residual errors given the various input values 302. For instance, when a map point 404a and a pose 406a do not align given the image data 410a, the OCVIBA engine 318 can determine a residual error that accounts for the misalignment between the parameters.

During the bundle adjustment process, the OCVIBA engine 318 can minimize the residual errors. For instance, the OCVIBA engine 318 can use Equation (1) below to minimize one or more of a calibration data residual error $r_0$, an inertial residual error $r_{I_{ij}}$, or an image data residual error $r_{C_{il}}$, for an estimate $X_k^*$ of the state of all key frames up to time k. For instance, $X_k^*$ can be the estimated state which minimizes a negative log-posterior of the state given the measurements by changing the state. One or more calibration data residual errors $r_0$ can indicate errors in the camera calibration data 408, IMU calibration data 416, or both. One or more inertial residual errors $r_{I_{ij}}$ can indicate errors in the inertial data 418a-b. One or more image data residual errors $r_{C_{il}}$ can indicate errors in the image data 410a-e.

$K_k$ can denote the set of all key frames up to time k; $X_k$ can denote the state of all key frames up to time k; $C_i$ can denote the image, e.g., image measurements, at key frame captured at time i; $Z_k$ can denote the set of measurements collected up to time k; $I_{ij}$ can denote the set of IMU measurements acquired between two consecutive key frames i and j; l can denote landmark l seen at time i. $\Sigma_0$ can be a calibration data covariance matrix that corresponds to the calibration data residual error $r_0$; $\Sigma_{ij}$ can be an inertial covariance matrix that corresponds to the inertial residual error $r_{I_{ij}}$; and $\Sigma_C$ can be an image data covariance matrix that corresponds to the image data residual error $r_{C_{il}}$.

$$X_k^* = \arg\min_{X_k} - \log_e p(X_k | Z) \tag{1}$$

$$= \arg\min_{X_k} \|r_0\|_{\Sigma_0}^2 + \sum_{(i,j) \in K_k} \|r_{I_{i,j}}\|_{\Sigma_{ij}}^2 + \sum_{i \in K_k} \sum_{i \in C_i} \|r_{C_{il}}\|_{\Sigma_C}^2$$

As part of the graph creation process, the OCVIBA engine 318 can propagate elapsed time data through the OCVIBA graph 400. The OCVIBA engine 318 can perform the elapsed time data propagation using the corrected IMU measurements 314, e.g., between consecutive key frames. The elapsed time can indicate different times at which the augmented reality device 300 captured the respective data, e.g., the image data 410a-e, the inertial data 418a-c, or both.

As part of the graph creation process, the OCVIBA engine 318 can propagate delta values, or changes over time based on two key frames, through the OCVIBA graph 400. The delta values can be for positions p, velocities v, orientations R, or a combination of these. A position p can indicate a translational component in 3D space. A pose, as described in this document, can be a six-dimensional component that indicates a translational component in 3D space, e.g., a position p, and an orientation in 3D space, e.g., an orientation R. The OCVIBA engine 318 can perform the delta propagation using the corrected IMU measurements 314, e.g., between consecutive key frames. During bundle adjustment, when the OCVIBA engine 318 updates parameter values, the OCVIBA engine 318 can update parameters using the delta values. For instance, the OCVIBA engine 318 can use the delta values during preintegration when determining how much to change parameter values. The delta values can represent the change in a corresponding parameter values. Optionally, a measure of confidence in the accuracy can be determined based on the covariance or information matrix.

Table 1, below, depicts example pseudo code for a graph creation process. The OCVIBA engine 318 can use code based on the pseudo code to generate the OCVIBA graph 400. As indicated in Table 1, the OCVIBA engine 318 can use the delta values during noise covariance propagation.

TABLE 1

Graph Creation Pseudo Code

``` 
''' Graph creation '''
# Initialize delta position
dR = identity_matrix(3, 3)   #3×3 identity matrix
dv = 0
dp = 0
dt_ij = 0
# Accumulate velocity changes from IMU measurements
for imu_meas in imu_measurements_from_i_to_j:
    w_c = corrected_angular_velocity = imu_meas.angular_velocity − gyro_bias
    a_c = corrected_acceleration = imu_meas. acceleration − accel_bias
    # Integrate rotation
```

TABLE 1-continued

Graph Creation Pseudo Code

```
dR, Jr = dR * Exp(w_c * imu_meas.dt) # Jr is the right Jacobian of so(3)
    # In other words, the output of the rotation integration is the updated
    preintegrated rotation as well as the right-Jacobian.
# Noise covariance propagation of delta measurements
A = update_A(dR, a_c, dt)
Bg = update_B(Jr, dt)
Ca = update_C(dR, dt)
# [gyro, accel]_meas_cov are the IMU measurement covariances identified via
# factory calibration or parameter tuning
preint_meas_cov = A * preint_meas_cov _ * A.transpose( ) + Bg *
gyro_meas_cov * Bg. transpose( ) + Ca * accel_meas_cov * Ca.transpose( );
# Preintegrate position and velocity
dp += dv * dt + dR * a_c *dt^2 / 2;
dv += dR * a_C * dt;
# Normalize rotation, in case of numerical error accumulation
dR = normalize_R(DR)
dt_ij += dt
```

In some implementations, augmented reality device 300 can use the biases, the delta values, or both, to account for incomplete data captured by sensors in the augmented reality device 300. For instance, when the augmented reality device 300 is in a room with white walls and image data has little change between one image and the next, the augmented reality device 300 can use the biases to determine that the augmented reality device 300 should rely on IMU measurements when image data does not indicate any change while the IMU data indicates movement of the augmented reality device 300.

Returning to FIG. 3, once the OCVIBA engine 318 has created the OCVIBA graph 320, the OCVIBA engine 318 can optimize the graph 322. For instance, the OCVIBA engine 318 can use one or more inertial residual errors $r_{I_{ij}}$, one or more calibration data residual errors $r_0$, one or more image data residual errors $r_{C_{ij}}$, or a combination of these, to optimize the graph 322. The graph optimization 322 can include the OCVIBA engine minimizing one or more of the inertial residual errors $r_{I_{ij}}$, the data residual errors $r_0$, or the image data residual errors $r_{C_{ij}}$. The OCVIBA engine 318 can optimize the graph 322 using a non-linear optimization, e.g., using a Levenberg-Marquardt process, to minimize one or more of the errors. The OCVIBA engine 318 can use inertial residual errors for positions p, velocities v, orientations R, gyration biases $b^g(t)$, accelerometer biases $b^a(t)$, or a combination of these. The biases can be slowly time-varying. The OCVIBA engine 318 can model one or both of the biases by integrating white noise.

The OCVIBA engine 318 can use equation (2) below for the gyration biases $b^g(t)$ where $\omega_{WB}$ is the measured gyration, $\omega_{WB}$ is the angular velocity, and $n^g(t)$ is the Gaussian noise for gyration.

$$\tilde{\omega}_{WB} = \omega_{WB} + b^g(t) + n^g(t) \quad (2)$$

The OCVIBA engine 318 can use equation (3) below for the accelerometer biases $b^g(t)$ where $R_{BW}$ is rotation, $a_W(t)$ is acceleration, g is gravity, and $n^a(t)$ is the Gaussian noise for acceleration.

$$\tilde{a}_B = R_{BW}(a_W(t) - g) + b^a(t) + n^a(t) \quad (3)$$

As part of the graph optimization 322, the OCVIBA engine 318 can perform preintegration. The OCVIBA engine 318 can perform preintegration instead of performing an integration process to propagate IMU measurements from a key frame i to a later key frame j. To reduce changes to the biases during the optimization process, the OCVIBA engine 318 uses preintegration instead of integration. As part of the preintegration process, the OCVIBA engine 318 can make some assumptions to reduce changes in one or more of the biases for a time frame, e.g., that includes the key frame i and the key frame j.

For instance, the OCVIBA engine 318 can use a preintegration process to define the motion between two consecutive key frames, e.g., the key frames i and j, using one or more of the IMU measurements captured between the capture of the two consecutive key frames. In some examples, the OCVIBA engine 318 can use all of the IMU measurements captured between the two consecutive key frames during the preintegration process. The IMU measurements can include the IMU measurements captured at substantially the same time that one or both of the key frames were captured.

The OCVIBA engine 318 can perform the preintegration process in terms of rotation, velocity, position, or a combination of two or more of these. The OCVIBA engine 318 can, as part of the preintegration process, correct a prediction of rotation, velocity, position, or a combination of these, by linearizing one or more of the IMU biases, e.g., for gyration or acceleration. The OCVIBA engine 318 can, as part of the preintegration process, correct a prediction of rotation, velocity, position, or a combination of these, using Jacobians to apply a change in a bias without recomputing all values in the OCVIBA graph 400.

For example, the OCVIBA engine 318 can determine the motion of the augmented reality device 300 between locations at which cameras, included in the augmented reality device 300, captured the two consecutive key frames by preintegrating a change in rotation R, a change in velocity v, a change in position p, or a combination of these. The OCVIBA engine 318 can use equation (4), below, to determine a change in rotation $\Delta R_{i,i+1}$. In equation (4) below, $R_{WB}{}^i$ is the rotation residual error for key frame i, $R_{WB}{}^{i+1}$ is the rotation residual error for key frame i+1, e.g., key frame j, $b_i^g$, is the gyroscope bias at time i, and $J_{\Delta R}{}^g$ is the gyroscope Jacobian for the two consecutive key frames represented by $\Delta R$, e.g., key frames i and i+1.

$$R_{WB}{}^{i+1} = R_{WB}{}^i \Delta R_{i,i+1} \operatorname{Exp}((J_{\Delta R}{}^g b_i^g)) \quad (4)$$

The OCVIBA engine 318 can use code based on the pseudo code in Table 2, below, to implement equation (4). In Table 2, below, "# . . . " indicates that the OCVIBA engine 318 can perform steps for other parts of the graph creation process, the preintegration process, or both, that are not included in Table 2 for the sake of brevity. These steps can be steps in preintegration processes for velocity, position, or both.

TABLE 2

Rotational Residual Error Preintegration

```
''' Graph creation '''
# Initialize delta rotation
dR = identity_matrix(3, 3)
# . . .
# Propagate rotational changes using IMU measurements
for imu_meas in imu_measurements_from_i_to_j:
        dt = imu_meas.dt
        w_c = corrected_angular_velocity imu_meas.angular_velocity - gyro_bias
        # . . .
        # Integrate rotation
        dR, Jr = dR * Exp( w_c * dt )          # Jr is right Jacobian of 50(3)
        # Normalize rotation, in case of numerical error accumulation
        dR = normalize_R(dR)
        dt_ij += dt
''' Graph creation '''
# Correct propagated rotation to predict rotation at keyframe j
R_i = keyframe_i.world_R_imu                    # Estimated rotation at keyframe i
bg_incr = bg - linearized_bg
R_j_predicted = R_i* (dR * Jr(bg_incr))         # Correct with linearized bias
# Calculate rotational residual between propagation and estimation
R_j = keyframe_j.world_R_imu                    # Estimated rotation at keyframe
R_res = R_j_predicted. transpose( ) * R_j
return Log(R_res)                                # Use a minimal rotational representation
```

During the preintegration process, the OCVIBA engine 318 can update values for one or more of the vertices in the OCVIBA graph 400. For instance, when updating the graph based on the rotational residual error, the OCVIBA engine 318 can calculate a rotational residual error as R_res, shown in Table 2, above. The OCVIBA engine 318 can then use the rotational residual error, or a log of the rotational residual error, to update one or more vertices in the OCVIBA graph 400, e.g., a vertex connected to a vertex for the inertial data 418a-b.

The OCVIBA engine 318 can use equation (5), below, to determine a change in velocity $\Delta v_{i,i+1}$. In equation (5) below, $_Wv_B^i$ is the velocity residual error for key frame i, $_Wv_B^{i+1}$ is the velocity residual error for key frame i+1, e.g., key frame j, $R_{WB}^i$ is the rotation residual error for key frame i, $b_i^g$ is the gyroscope bias at time i, $J_{\Delta v}^g$ is the gyroscope Jacobian for the two consecutive key frames represented by $\Delta v$, e.g., key frames i and i+1, $b_i^a$ is the accelerometer bias at time i, $J_{\Delta v}^a$ is the accelerometer Jacobian for the two consecutive key frames represented by $\Delta v$, e.g., key frames i and i+1, and gravity $g_W$.

$$_Wv_B^{i+1} = {_Wv_B^i} + g_W \Delta t_{i,i+1} + R_{WB}^i (\Delta v_{i,i+1} + J_{\Delta v}^g b_i^g + J_{\Delta v}^a b_i^a) \quad (5)$$

The OCVIBA engine 318 can use code based on the pseudo code in Table 3, below, to implement equation (5). In Table 3, below, "# . . ." indicates that the OCVIBA engine 318 can perform steps for other parts of the graph creation process, the preintegration process, or both, that are not included in Table 3 for the sake of brevity. These steps can be steps in preintegration processes for rotation, position, or both.

TABLE 3

Velocity Residual Error Preintegration

```
''' Graph creation '''
# Initialize delta position
dR = identity_matrix(3, 3)    # 3×3 identity matrix
dv = 0
# . . .
dt_ij = 0
# Accumulate velocity changes from IMU measurements
for imu_meas in imu_measurements_from_i_to_j:
        w_c = corrected_angular_velocity = imu_meas.angular_velocity - gyro_bias
        a_c = corrected_acceleration - imu_meas.acceleration - accel_bias
# Preintegrate rotation, velocity
dR, Jr = dR * Exp(w_c * imu_meas.dt) # Jr is right Jacobian of so(3)
# . . .
dv += dR * a_c * dt;
# . . .
dt_ij += dt
''' Graph optimization '''
# Predicted velocity
dbg = bg_estimate - linearized_bg_at_i
dba = ba_estimate - linearized_ba_at_i
dv_corrected - dv + dv_dba * dba + dv_dbg * dbg
v_j_predicted = v_i + R_i * dv_corrected + dt *g_world
# Calculate velocity residual between propagation and estimation
v_res - R_i.transpose( ) * (v_j-vj_predicted)
return v_res
```

During the preintegration process, the OCVIBA engine 318 can update values for one or more of the vertices in the OCVIBA graph 400. For instance, when updating the graph based on the velocity residual error, the OCVIBA engine 318 can calculate a velocity residual error as v_res, shown in Table 3, above. The OCVIBA engine 318 can then use the rotational residual error to update one or more vertices in the OCVIBA graph 400, e.g., a vertex connected to a vertex for the inertial data 418a-b.

The OCVIBA engine 318 can use equation (6), below, to determine a change in position $\Delta p_{i,i+1}$. In equation (6) below, $_Wp_B^i$ is the position residual error for key frame i, $_Wp_B^{i+1}$ is the position residual error for key frame i+1, e.g., key frame j, $_Wv_B^i$ is the velocity residual error for key frame i, $R_{WB}^i$ is the rotation residual error for key frame i, $b_i^g$ is the gyroscope bias at time i, $J_{\Delta p}^g$ is the gyroscope Jacobian for the two consecutive key frames represented by $\Delta p$, e.g., key frames i and i+1, $b_i^a$ is the accelerometer bias at time i, $J_{\Delta p}^a$ is the accelerometer Jacobian for the two consecutive key frames represented by $\Delta p$, e.g., key frames i and i+1, and gravity $g_W$.

$$_W p_B^{i+1} = {}_W p_B^i + {}_W v_B^i \Delta t_{i,i+1} + \frac{1}{2} g_W \Delta t_{i,i+1}^2 + R_{WB}^i \left( \Delta p_{i,i+1} + J_{\Delta p}^g b_i^g + J_{\Delta p}^a b_i^a \right) \quad (6)$$

The OCVIBA engine 318 can use code based on the pseudo code in Table 4, below, to implement equation (6). In Table 4, below, "# . . . " indicates that the OCVIBA engine 318 can perform steps for other parts of the graph creation process, the preintegration process, or both, that are not included in Table 4 for the sake of brevity. These steps can be steps in preintegration processes for rotation, velocity, or both.

positional residual error to update one or more vertices in the OCVIBA graph 400, e.g., a vertex connected to a vertex for the image data 410a-e.

When updating the graph, the OCVIBA engine 318 can use the Jacobians. The Jacobians can indicate a relationship in how parameters in the OCVIBA graph 400 relate to residual errors modeled by the OCVIBA graph 400. The OCVIBA engine 318 can use the Jacobians to determine how a change to one of the parameters might affect the corresponding residual error.

The OCVIBA engine 318 can use the various values discussed above to determine a change to the OCVIBA graph 400 that is most likely to reduce one or more of the residual error values. The OCVIBA engine 318 can use the Jacobians to determine an amount of change to one or more of the values. The OCVIBA engine 318 can use the residual error values to determine which parameters in the OCVIBA graph 400 to change.

The OCVIBA engine 318 can perform the preintegration process as part of an iterative loop. The OCVIBA engine 318 can perform preintegration until one or more of the residual errors satisfies, e.g., is less than or equal to or either, a corresponding threshold value.

At a high level, the OCVIBA engine 318 can perform an iterative process that includes one or more loops of the process. The OCVIBA engine 318 can determine an estimate for the OCVIBA graph 400. The estimate can be based on input values 302, e.g., received from another component in a SLAM engine.

The OCVIBA engine 318 can then determine residual errors for the OCVIBA graph 400. The OCVIBA engine 318 can determine, for each of the residual errors, how close the residual error is to zero. A residual error of zero can indicate a high likelihood that the corresponding parameter value in

TABLE 4

Positional Residual Error Preintegration

``` 
' ' ' Graph creation ' ' '
# Initialize delta position
dR = identity_matrix(3, 3)   # 3×3 identity matrix
dv = 0
dp = 0
dt_ij = 0
# Accumulate velocity changes from IMU measurements
for imu_meas in imu_measurements_from_i_to_j:
        w_c = corrected_angular_velocity = imu_meas.angular_velocity − gyro_bias
        a_c = corrected_acceleration = imu_meas.acceleration − accel_bias
        # Preintegrate rotation, position and velocity
        dR, Jr = dR * Exp(w_c * imu_meas.dt)     # Jr is right Jacobian of so(3)
        dp += dv * dt + dR * a_c * dt^2 / 2;
        dv += dR * a_c * dt;
        # . . .
        dt_ij += dt
' ' ' Graph optimization ' ' '
# Predicted translation
dbg = bg_estimate − linearized_bg_at_i
dba = ba_estimate − linearized_ba_at_i
dp_corrected = dp + dp_dba * dba + dp_dbg * dbg # Corrected with linearized biases
p_j_predicted = p_i + R_i * dp_corrected + (v_i + 0.5 *g_world * dt) *dt
# Calculate translation residual between propagation and estimation
p_res = R_i.transpose( ) * (p_j − p_j_predicted);
return p_res
```

During the preintegration process, the OCVIBA engine 318 can update values for one or more of the vertices in the OCVIBA graph 400. For instance, when updating the graph based on the positional residual error, the OCVIBA engine 318 can calculate a positional residual error as p_res, shown in Table 4, above. The OCVIBA engine 318 can then use the the OCVIBA graph 400 is correct. A residual error farther from zero can indicate a lower likelihood that the corresponding parameter value in the OCVIBA graph 400 is correct. As a result, the OCVIBA engine 318 is more likely to update parameter values with residual errors that are further from zero than parameter values with residual errors that are closer to zero. The OCVIBA engine 318 selects the parameter values to update by minimizing the residual error values, e.g., as much as possible.

The OCVIBA engine 318 can determine which parameter values to update using a derivative of a slope that associates a parameter value with the corresponding residual error. A greater slope can indicate a residual error that is further from zero than a smaller slope. When the OCVIBA graph 400 represents a multi-dimensional space, for which there is one dimension for each parameter in the OCVIBA graph 400, the OCVIBA engine 318 can determine the greatest slope in the multi-dimensional space and select the parameter values that correspond to that slope.

The OCVIBA engine 318 then updates the selected parameter values. As a result, the OCVIBA engine 318 can update the OCVIBA graph 400.

The OCVIBA engine 318 determines whether a threshold is satisfied for the updated parameters in the OCVIBA graph 400. If so, the OCVIBA engine 318 can determine to stop the iterative process. This determination can include the OCVIBA engine 318 providing updated calibration parameters, either camera or IMU or both, to a SLAM engine. This determination can include the OCVIBA engine 318 providing an updated trajectory, updated environment model, an updated estimated device position, or a combination of two or more of these.

If a threshold is not satisfied for the updated parameters in the OCVIBA graph 400, the OCVIBA engine 318 can perform another iteration in the process. For instance, the OCVIBA engine 318 can optimize the updated OCVIBA graph 400 and need not generate a new OCVIBA graph 400.

Because the OCVIBA engine 318 is optimizing the parameters in the OCVIBA graph 400, the OCVIBA engine 318 need not store the corrected IMU measurements 314 in memory, e.g., in contrast to some prior systems. Instead, the OCVIBA engine 318 only needs to optimize the OCVIBA graph using parameters represented by the OCVIBA graph 400.

The augmented reality device 300 can be the augmented reality device 100, described with reference to FIG. 1. In some examples, the augmented reality device 300 can be the augmented reality device 200*a-b*, described with reference to FIG. 2. The augmented reality device 300 can be any appropriate device, e.g., a robot or a map generation system.

The augmented reality device 300 can include several different functional components, including a SLAM engine and the OCVIBA engine 318. The SLAM engine, the OCVIBA engine 318, or a combination of these, can include one or more data processing apparatuses. For instance, each of the SLAM engine and the OCVIBA engine 318 can include one or more data processors and instructions that cause the one or more data processors to perform the operations discussed herein.

The various functional components of the augmented reality device 300 may be installed on one or more computers as separate functional components or as different modules of a same functional component. For example, the SLAM engine and the OCVIBA engine 318 can be implemented as computer programs installed on one or more computers in one or more locations that are coupled to each other through a network. In cloud-based systems for example, these components can be implemented by individual computing nodes of a distributed computing system. In some implementations, the OCVIBA engine 318 can be part of the SLAM engine.

Figure 5:
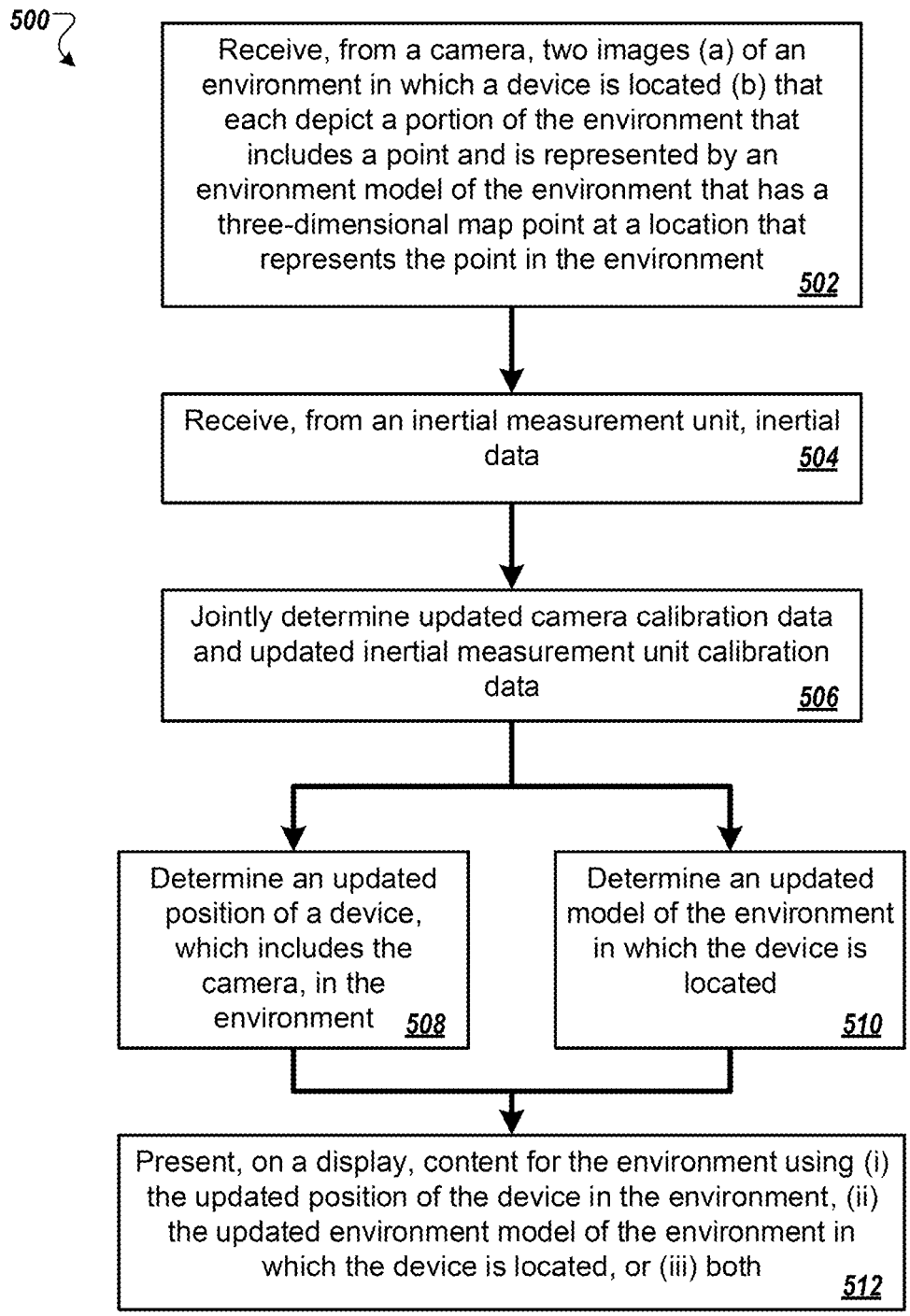
FIG. 5 is a flow diagram of a process for determining a predicted relative position of a camera with respect to another camera.

FIG. 5 is a flow diagram of a process 500 for determining a predicted relative position of a camera with respect to another camera. For example, the process 500 can be used by a device, such as the augmented reality device 100 described with reference to FIG. 1 or another headset or computer vision device.

A device receives, from a camera, two images (a) of an environment in which the device is located (b) that each depict a portion of the environment that includes a point and is represented by an environment model of the environment that has a three-dimensional map point at a location that represents the point in the environment (502). The device can receive multiple pairs of stereo images from two cameras or multiple images from a single camera.

The camera has camera calibration data that identifies a first rotation and a first translation between the camera and a first sensor in the device. The first sensor can be an IMU, a reference camera, a global positioning system sensor, or another appropriate sensor.

The cameras can be part of the device or physically separate from the device. For instance, the device can be a headset, e.g., an augmented reality device, that includes the two or more cameras. The device can be physically separate from the two or more cameras and receive the plurality of images using a network, e.g., the device can be a server or another computer that receives the images from the cameras.

The device can receive images that depict objects not represented by the model of the environment. For instance, a first part of an image from the plurality of images can depict objects represented by the model and a second part of the image can depict objects not represented by the model. The objects not represented by the model can include objects from a portion of the environment. When the environment is a house, the model can include data for portions of the house depicted in images captured by the two or more cameras included in an augmented reality device. For example, the model can include data for a kitchen and a living room. When the augmented reality device moves toward a family room, the cameras can capture images that depict part of the living room and part of the family room. In this example, the model can include data for the depicted part of the living room while not including data for the depicted part of the family room. The device can perform the process 500 as part of the process to update the model with data for the family room, to determine a trajectory of the augmented reality device as it moves toward the family room, or another appropriate purpose. For instance, the device can perform the process 500, or some steps in the process 500, as part of a SLAM process.

In some implementations, the device can include more than two cameras. In these implementations, the device can perform the process 500 with respect to all of the included cameras or only a proper subset of the cameras. For example, the device can receive images from two of three cameras included in the device and perform the process 500 for those two cameras.

The device receives, from an inertial measurement unit, inertial data (504). The inertial measurement unit is included in the same device that includes the camera, e.g., the same headset or augmented reality device. In some implementations, the device can receive the inertial data from two or more inertial measurement units. The inertial measurement unit can be the first sensor for which the camera has camera calibration data.

The inertial measurement unit has inertial measurement unit calibration data that identifies a second rotation and a second translation between the inertial measurement unit and a second sensor in the device. The second sensor can be the camera, a reference camera, e.g., the same reference camera as that used for the camera calibration data, a global positioning system sensor, e.g., the same global positioning system sensor as that used for the camera calibration data, or another appropriate sensor.

The inertial data can include position data that represents a position relative to a global reference frame, orientation data, angular velocity data, linear velocity data, acceleration data, or a combination of two or more of these. For instance, the inertial data can include angular velocity data and linear velocity data or angular velocity data and acceleration data. In some examples, the device can determine a position relative to a global reference frame using inertial data from the one or more inertial measurement units.

The inertial measurement units can be the inertial measurement units 102 described with reference to FIG. 1. For instance, the inertial measurement units can include a gyroscope and an accelerometer.

The device jointly determines updated camera calibration data and updated inertial measurement unit calibration data (506). The updated camera calibration data can identify an updated first rotation and an updated first translation between the camera and the first sensor. The updated inertial measurement unit calibration data can identify an updated second rotation and an updated second translation between the inertial measurement unit and the second sensor. The calibration data can indicate a predicted relative position for one sensor with respect to another sensor, e.g., a reference sensor.

In some examples, the device can determine the camera calibration data for some cameras included in a system, e.g., an augmented reality device, but not all of the cameras included in the system. For instance, the device can determine camera calibration data for a first camera with respect to a second camera, but not for all of the two or more cameras included in the system. The second camera can be a reference camera. Similarly, the device can determine inertial measurement unit calibration data for some but not all inertial measurement units included in the system.

The device can determine the predicted relative position using at least some of the plurality of images, or portions of some of the plurality of images, and the inertial data. The device can determine the predicted relative position using data from the model of the environment, e.g., 3D points of the environment. The device can determine the predicted relative position using a trajectory of a device that includes the two or more cameras, e.g., the device or another device. The device can determine the predicted relative position using pose data for a device that includes the two or more cameras. The pose data can represent an orientation, a position, or both, for a device that includes the two or more cameras.

The device can determine the predicted relative position using a direction of gravity, e.g., determined by a gravimeter. For instance, since a direction of gravity is generally the same, e.g., toward the center of the Earth, the device can use the direction of gravity with respect to a camera, or a device that includes the camera, to determine an orientation of the camera, e.g., along with other inertial data.

In some implementations, the device can determine the predicted relative position using a device profile for a device that includes the two or more cameras, a sensor profile, or both. The device can use a sensor profile for a camera, a sensor profile for an inertial measurement unit, or both. The profile can include data that indicates factory calibration data. The factory calibration data can include a default space between a first camera and a second camera for which the device determines the predicted relative position. The default space can be defined using default translation data and default rotation data. The data can include one or more values. For instance, the default translation data can be a single value, e.g., "d", or multiple values, e.g., x, y, z. The default rotation data can be a single value, e.g., "r", or multiple values, e.g., a matrix of values.

Factory calibration data can indicate a minimum, a maximum, or both, amount of space between two cameras. The amount of space between the two cameras can include rotation data, translation data, or both. For example, the factory calibration data can indicate that there can be at most $r_{max}$ rotation between the two cameras. In some examples, when the factory calibration data includes a minimum amount of space between the two cameras, it does not include a minimum amount of rotation, e.g., when the minimum rotation $r_{min}$ is zero. The data $r_{max}$, $r_{min}$, or both, can be single values or include multiple values, e.g., they can be matrices.

When the factory calibration data includes translation data for the amount of space between the cameras, the translation data can include one value or multiple values for a minimum translation or a maximum translation or both. For instance, the factory calibration data can include $t_{min}$ as a single value or a vector that indicates the closest distance between the two cameras, e.g., when a device that includes the two cameras is still functioning and not broken. The factory calibration data can include $t_{max}$ as a single value or a vector that indicates the greatest distance between the two cameras, e.g., when a device that includes the two cameras is still functioning and not broken.

In some implementations, the factory calibration data can include a minimum, a maximum, or both, amount of space between two inertial measurement units. Each of the two inertial measurement units can each be associated with one of the two cameras. For instance, a first inertial measurement unit can be the closest IMU to a first camera from the two or more cameras, and a second inertial measurement unit can be the closest IMU to a second camera from the two or more cameras. In some examples, the first inertial measurement unit can be within a threshold distance from the first camera and the second inertial measurement unit can be within the threshold distance from the second camera. As a result, the first inertial measurement unit can be associated with the first camera and the second inertial measurement unit can be associated with the second camera. When determining the predicted relative position the first camera with respect to the second camera, the device can use the calibration data for the first inertial measurement unit, the second inertial measurement unit, or both.

The factory calibration data can indicate a maximum or minimum or both threshold amount for the predicted relative position. For example, if the device determines that the predicted relative position is greater than a maximum threshold amount of separation included in the factory calibration data, the device can use the maximum threshold amount of separation for the predicted relative position. If the device determines that the predicted relative position is less than a minimum threshold amount of separation included in the calibration data, the device can use the minimum threshold amount of separation for the predicted relative position.

In some implementations, the device can use bias data when determining the relative positions. The bias data can account for incorrect measurements by one of the inertial measurement units. For instance, if a second device that includes the one or more cameras is stationary, e.g., sitting on a desk, but a first inertial measurement unit indicates that the second device is moving, e.g., the second device's acceleration is greater than zero, the device can generate bias data for the second device based on the incorrect measurement. The bias data can account for incorrect measurements by negating the incorrect portion of a measurement when the second device is actually moving. For instance, the device can determine bias data of "acceleration −0.002 m/s" for an inertial measurement unit when the device determines that the inertial measurement unit generates data that indicates that the second device has an acceleration of 0.002 m/s when the second device is stationary. In some examples, the bias data can account for changes in the second device, such as when the second device heats up or has natural magnetic nuances or both.

In some implementations, the device can use a penalty function when determining the predicted relative positions. The penalty function can account for how much the device can trust a signal, e.g., particular sensor data, given all of the input values used to determine a predicted relative position. For example, the device can use a penalty function can to determine a corresponding residual error value. As part of the penalty function process, the device can combine one or more of the input values, e.g., the inertial data or data from the plurality of images, with corresponding weights. The device can select different weights in different situations, e.g., based on different combinations of input values.

The device can generate one or more of the weights using a measurement that indicates an accuracy of the corresponding input values. For instance, the device can calculate a covariance to determine the accuracy of a given signal based on all of the input measurements together. The device can use the covariance to determine a corresponding weight value.

In some implementations, the device can use multiple penalty functions when determining the predicted relative positions. The device can use separate penalty functions for different data types, for different sensors, or both. For instance, the device can use a first penalty function for image data and a second penalty function for inertial data. The device can use a third penalty function for calibration data, e.g., factory calibration data or prior predicted calibration data. When using multiple penalty functions, the device can minimize the error of all the penalty functions when determining the predicted relative positions.

In some implementations, the device can use the factory calibration data to determine whether to update one or more OCVIBA parameters, e.g., graph parameters, which OCVIBA parameters to update, or both. The OCVIBA parameters can be camera calibration parameters, updated camera calibration parameters, IMU calibration parameters, updated IMU calibration parameters, or a combination of these. For instance, the device can use updated camera calibration data and updated IMU calibration data.

The device can compare the OCVIBA parameters to corresponding threshold parameters. If the OCVIBA parameters satisfy, e.g., are within a threshold distance of, the threshold parameters, the device can determine to not update the parameters, to stop an iterative updating process, or both. If the OCVIBA parameters do not satisfy, e.g., are not within a threshold distance of, the threshold parameters, the device can determine to update corresponding OCVIBA parameters, continue the iterative update process, or both. The threshold distance can be a threshold distance of the absolute values of an OCVIBA parameter and a corresponding threshold parameter. In some examples, the device can have multiple threshold distances, e.g., one threshold value for OCVIBA parameter values greater than the corresponding threshold value and another threshold distance for OCVIBA parameter values less than the corresponding threshold value.

The device can use a difference between the OCVIBA parameters and factory calibration parameters to determine which parameters to change. When a particular OCVIBA parameter varies from the corresponding factory calibration parameter, the device can determine that the particular OCVIBA parameter might need to be updated. The device can determine which parameters to update from the parameters that might need to be updated by analyzing the types of the parameters. For instance, the parameters can be a visual parameter, an IMU parameter, or both.

When the device determines a quantity of the visual parameters satisfies a threshold, the device can update one or more visual parameters. The visual parameters can be parameters represented by the vertices connected to, including, or both, the image data 410*a-e* in the OCVIBA graph 400 from FIG. 4. When the device determines that a quantity of the IMU parameters satisfies a threshold, the device can update one or more IMU parameters. The IMU parameters can be parameters represented by the vertices connected to, including, or both, the inertial data 418*a-b* in the OCVIBA graph 400 from FIG. 4. The threshold can be a quantity of parameters for the other data type for which the difference in the corresponding parameter satisfies a corresponding factory calibration parameter, for which there is a residual error, or both. For instance, when the device determines that a quantity of residual errors for the visual parameters is greater than a quantity of residual errors for the inertial parameters, the device can determine to update one or more of the visual parameters.

When the device determines that some of the calibration parameters satisfy threshold values, e.g., are within a threshold distance of corresponding factory calibration parameters, the device can adjust parameters other than calibration parameters, e.g., in the OCVIBA graph 400 from FIG. 4. For instance, when the camera calibration parameters 408 satisfy corresponding threshold values, the device can determine to adjust one or more of the map points 404*a-c* rather than the camera calibration data 408.

The device determines an updated position of a second device, which includes the camera, in the environment (508). The updated position determination can be part of a joint determination with the updated camera calibration data and the updated inertial measurement unit calibration data. The updated position can be an estimated position, e.g., an updated estimated position. The device can use the predicted relative position for the camera to determine the updated position of the second device in the environment, e.g., as part of the joint determination process. The device can determine the updated position using a prior position of the second device in the environment, e.g., as part of a joint determination process.

In some implementations, the device can determine the updated position when a threshold is satisfied. For example, the device can determine the updated position after a threshold period of time. The threshold period of time can indicate times at which key frames are captured. The device can determine the updated position after receiving a threshold amount of data from one or more sensors, e.g., the camera, the inertial measurement unit, or both. The device can determine the updated position after a threshold amount of movement, e.g., translation, rotation, or a combination of both.

The device determines an updated model of the environment in which the second device is located (510). The updated model determination can be part of a joint determination with the updated camera calibration data and the updated inertial measurement unit calibration data. The device can use the predicted relative position for the camera to determine the updated model of the environment, e.g., as part of the joint determination process. The device can determine the updated model using data for a prior model of the environment. The device can determine the updated model using an updated position for the second device, a prior position for the second device, or both.

In some implementations, the device can determine the updated model when a threshold is satisfied. For example, the device can determine the updated model after a threshold period of time. The threshold period of time can indicate times at which key frames are captured. The device can determine the updated model after receiving a threshold amount of data from one or more sensors, e.g., the two or more cameras, the one or more inertial measurement units, or both. The device can determine the updated model after a threshold amount of movement, e.g., translation, rotation, or a combination of both.

The device presents, on a display, content for the environment using (i) the updated position of the device in the environment, (ii) the updated environment model of the environment in which the device is located, or (iii) both (512). The device can present the content after storing the updated position, the updated environment model, or both, e.g., in memory. In some examples, the device can present the content substantially concurrently with storing the updated position, the updated environment model, or both. For instance, the device can determine the updated position, the updated environment model, or both. The device can begin to store the updated position, the updated environment model, or both, and before the storing process is complete, the device can begin to present the content for the environment.

The device can present the content for the environment using the corresponding determined data. For example, when the device determines the updated position, the device can present the content using the updated position. When the device determines the updated environment model, the device can present the content using the updated environment model. When the device determines the updated position, the device can present the content using the updated position, the updated environment model, or both.

The order of steps in the process 500 described above is illustrative only, and determination of the predicted relative position of the camera with respect to the other camera can be performed in different orders. For example, the device can receive the inertial data before or substantially concurrently with the receipt of the plurality of images. In some implementations, the device can determine the updated position after determining the updated model.

In some implementations, the process 500 can include additional steps, fewer steps, or some of the steps can be divided into multiple steps. For example, the device can perform one of determining the updated position or determining the updated model, e.g., one of steps 508 or 510. For instance, the device can determine the updated position without determining the updated model, e.g., when determining a trajectory of the device. The device can determine the updated model without determining the updated position, e.g., and the updated model can be based on the predicted relative position for each of the two or more cameras.

In some implementations, the device can minimize one or more penalty functions, e.g., residual error value functions, when determining the updated device position, the updated model of the environment, or both. For instance, the device can use two penalty functions when determining the updated device position. The device can minimize the residual errors for each of the two penalty functions, e.g., a first penalty function for the image data and a second penalty function for the inertial data.

In some implementations, the device can perform step 508, 510, or both, using a mapping of image data for an image from the plurality of images to locations in the model of the environment. For instance, the device can determine the updated position, the updated model, or both, using 3D points from the model of the environment.

In some implementations, the device can determine a mapping of image data to locations in the model using at least one of the predicted positions for a camera in the two or more cameras. The device can determine the mapping instead of or in addition to performing one or both of steps 508 or 510. The device can use the mapping to create 3D points, e.g., for the updated model.

In some implementations, when determining the updated position of the second device, the device can determine pose data using the inertial data, at least one of the predicted relative positions, or a combination or both. For instance, the device can determine an orientation of the second camera, e.g., a pose, in the environment using the predicted relative positions.

In some implementations, the device can determine a trajectory for the second device that includes the camera using at least one of the predicted relative positions. For instance, the device can determine the trajectory for the second camera using some of the plurality of images, the inertial data, and at least one of the predicted relative positions.

In some implementations, some of the steps in the process 500 can be performed by different devices, or multiple devices can communicate while one of the multiple devices performs the process 500. For instance, when the device is a separate device from the second device that includes the two or more cameras, the second device can receive the plurality of images from the two or more cameras. The device can receive the plurality of images from the second device. The second device can receive the inertial data from the one or more inertial units. The device can receive the inertial data from the second device.

In some implementations, the device can perform the process 500 for a second device that includes a single camera. In some implementations, the device can perform the process 500 for a second device that includes two or more cameras. When the second device includes two or more cameras, the device can perform the joint determination, e.g., step 506 potentially in combination with one or both of steps 508 or 510, for all cameras at the same time. When the second device includes two or more inertial measurement units, the device can perform the joint determination, e.g., step 506 potentially in combination with one or both of steps 508 or 510, for all inertial measurement units at the same time.

When the device includes the two or more cameras, e.g., and is the same device as the second device, the device can communicate, e.g., using a network, with another computer that stores at least some of the model of the environment, at least some of the plurality of images, at least some of the inertial data, or a combination of two or more of these. In these implementations, the device can request, from the other computer, data for the model that is not stored locally on the device when updating the model. This can enable the device to perform the process 500 while minimizing an amount of memory used on the device to store the model. The other computer can include multiple computers, e.g., as part of a server system or in a cloud configuration.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A system comprising:
one or more computers and one or more storage devices on which are stored instructions that are operable, when executed by the one or more computers, to cause the one or more computers to perform operations comprising:
  receiving, from a camera included in a device, two images (a) of an environment in which the device is located (b) that each depict a portion of the environment that includes a point and is represented by an environment model of the environment that has a three-dimensional map point at a location that represents the point in the environment, the camera having camera calibration data that identifies a first rotation and a first translation that are both between the camera and a first sensor in the device;
  receiving, from an inertial measurement unit included in the device, inertial data for the device, the inertial measurement unit having inertial measurement unit calibration data that identifies a second rotation and a second translation that are both between the inertial measurement unit and a second sensor in the device; and
  jointly determining, using the two images, the inertial data, the camera calibration data, the inertial measurement unit calibration data, and the location for the three-dimensional map point or an initial estimated position of the device in the environment:
    a) updated camera calibration data that identifies an updated first rotation and an updated first translation between the camera and the first sensor;
    b) updated inertial measurement unit calibration data that identifies an updated second rotation and an updated second translation between the inertial measurement unit and the second sensor; and
    c) at least one of (i) an updated estimated position of the device in the environment or (ii) an updated environment model of the environment in which the device is located including an updated location for the three-dimensional map point.

2. The system of claim 1, wherein:
the first sensor comprises a reference sensor, and the second sensor comprises the reference sensor; or
the first sensor comprises the inertial measurement unit, and the second sensor comprises the camera; or
the first sensor and the second sensor comprise the inertial measurement unit that is a reference sensor; or
the first sensor and the second sensor comprise the camera that is a reference sensor.

3. The system of claim 1, the operations comprising:
presenting, on a display, content for the environment using (i) the updated estimated position of the device in the environment, (ii) the updated environment model of the environment in which the device is located including the updated location for the three-dimensional map point, or (iii) both.

4. The system of claim 1, the operations comprising:
determining, using a first penalty function, a first error value that indicates a predicted accuracy of the inertial measurement unit calibration data; and
determining, using a second penalty function, a second error value that indicates a predicted accuracy of the camera calibration data, wherein:
jointly determining the updated camera calibration data, the updated inertial measurement unit calibration data, and (i) the updated estimated position of the device in the environment or (ii) the updated environment model of the environment comprises minimizing the first error value and the second error value.

5. The system of claim 4, wherein one or more of:
i) the operations comprise selecting, using the inertial data, a first weight for the first penalty function, the one or more computers configured to select different weights based on different inertial data, wherein:
determining the first error value comprises determining, using the first penalty function and the first weight, the first error value; or
ii) wherein jointly determining the updated camera calibration data, the updated inertial measurement unit calibration data, and (i) the updated estimated position of the device in the environment or (ii) the updated environment model of the environment comprises minimizing the first error value and the second error value comprises minimizing a difference between (a) a factory calibration that indicates a default space between the camera and the first sensor, and (b) a currently predicted space between the first and the first sensor.

6. The system of claim 5, wherein, one or more of:
a) selecting the first weight comprises:
   determining a covariance for the inertial data; and
   selecting the first weight using the covariance for the inertial data; or
b) the default space between the camera and the first sensor comprises one or more default translation values and one or more default rotation values; or
c) the currently predicted space between the camera and the first sensor comprises one or more currently predicted translation values and one or more currently predicted rotation values.

7. The system of claim 1, wherein jointly determining the updated camera calibration data, the updated inertial measurement unit calibration data, and (i) the updated estimated position of the device in the environment or (ii) the updated environment model of the environment comprises:
   determining the updated camera calibration data using the two images, the inertial data, the camera calibration data, the inertial measurement unit calibration data, one or more constraints that indicate a limit for an amount of movement between the camera and the first sensor, and the location for the three-dimensional map point or the initial estimated position of the device in the environment.

8. The system of claim 7, wherein one or more of:
a) the operations comprise:
   determining an estimated distance between the inertial measurement unit and the second sensor using the inertial data, wherein jointly determining the updated camera calibration data, the updated inertial measurement unit calibration data, and (i) the updated estimated position of the device in the environment or (ii) the updated environment model of the environment comprises:
   comparing (i) the estimated distance between the inertial measurement unit and the second sensor and (ii) the one or more constraints that indicate the limit for the amount of movement between the camera and the first sensor; or
b) wherein the limit for an amount of movement between the camera and the first sensor comprises a maximum distance between the camera and the first sensor, a maximum rotation between a first surface on the camera and a second surface on the first sensor, or both; or
c) wherein the limit for an amount of movement between the camera and the first sensor comprises a minimum distance between the camera and the first sensor, a minimum rotation between a first surface on the camera and a second surface on the first sensor, or both; or
d) wherein the limit for an amount of movement between the camera and the first sensor comprises a maximum distance between the inertial measurement unit and the second sensor, a maximum rotation between a first surface on the inertial measurement unit and a second surface on the second sensor, or both; or
e) wherein the limit for an amount of movement between the camera and the first sensor comprises a minimum distance between the inertial measurement unit and the second sensor, a minimum rotation between a first surface on the inertial measurement unit and a second surface on the second sensor, or both.

9. The system of claim 8, wherein, one or more of:
f) the device includes:
   the camera and a second different camera; and
   the inertial measurement unit that is physically closer to the camera than any other cameras included in the device and a second different inertial measurement unit that is physically closer to the second different camera than any other cameras included in the device; and
the second sensor is the second different inertial measurement unit; or
g) the device includes:
   the camera and a second different camera; and
   the inertial measurement unit that is within a threshold physical distance from the camera and a second different inertial measurement unit that is within the threshold physical distance from the second different camera.

10. The system of claim 1, wherein:
the device includes two or more cameras; and
jointly determining the updated camera calibration data, the updated inertial measurement unit calibration data, and (i) the updated estimated position of the device in the environment or (ii) the updated environment model of the environment comprises jointly determining, for each of the two or more cameras, camera calibration data for the camera with respect to each of the other cameras included in the two or more cameras.

11. The system of claim 1, wherein:
the inertial data comprise position data that represents a position relative to a global reference frame, orientation data, angular velocity data, and linear velocity data; and
jointly determining the updated camera calibration data, the updated inertial measurement unit calibration data, and (i) the updated estimated position of the device in the environment or (ii) the updated environment model of the environment comprises determining the updated camera calibration data using the two images, the inertial data, the camera calibration data, the inertial measurement unit calibration data, the position data that represents a position relative to the global reference frame, the orientation data, the angular velocity data, and the linear velocity data.

12. The system of claim 11, wherein:
the inertial data comprise acceleration data; and
determining the updated camera calibration data comprises determining the updated camera calibration data using the two images, the camera calibration data, the inertial measurement unit calibration data, the position data that represents a position relative to the global reference frame, the orientation data, the angular velocity data, the linear velocity data, and the acceleration data.

13. The system of claim 1, wherein, one or more of:
a) the system is the device and comprises:
   the camera; and
   the inertial measurement unit; or
b) the device comprises a wearable device, a headset, or an augmented reality device.

14. The system of claim 1, wherein, one or more of:
a) jointly determining the updated camera calibration data, the updated inertial measurement unit calibration data, and (i) the updated estimated position of the device in the environment or (ii) the updated environment model of the environment comprises determining the updated environment model of the environment by updating the environment model; or
b) jointly determining the updated camera calibration data, the updated inertial measurement unit calibration data, and (i) the updated estimated position of the device in the environment or (ii) the updated environment model of the environment comprises determining a trajectory of the device in the environment; or c) jointly determining the updated camera calibration data, the updated inertial measurement unit calibration data, and (i) the updated estimated position of the device in the environment or (ii) the updated environment model of the environment comprises determining an orientation of the device in the environment using the two images and the inertial data; or d) jointly determining the updated camera calibration data, the updated inertial measurement unit calibration data, and (i) the updated estimated position of the device in the environment or (ii) the updated environment model of the environment comprises determining a trajectory of the device in the environment using the two images and the inertial data; or e) jointly determining the updated camera calibration data, the updated inertial measurement unit calibration data, and (i) the updated estimated position of the device in the environment or (ii) the updated environment model of the environment comprises determining a mapping of image data for one or more images from the two images to locations in the environment model of the environment in which the device is located; or f) receiving the two images comprises receiving at least one image from the two images that depicts data not represented by the environment model of the environment in which the device is located.

15. The system of claim 14, the operations comprising:
determining a prior position of the device, wherein jointly determining the updated camera calibration data, the updated inertial measurement unit calibration data, and (i) the updated estimated position of the device in the environment or (ii) the updated environment model of the environment is responsive to determining that a predetermined time period after the determination of the prior position of the device has expired.

16. The system of claim 1, the operations comprising maintaining, in a memory, the environment model of the environment in which the device is located.

17. The system of claim 1, the operations comprising:
determining, for the camera, whether a difference between (a) the updated camera calibration data and (b) the camera calibration data satisfies a threshold value; and
in response to determining that the difference satisfies the threshold value, updating a calibration profile for the camera using the updated camera calibration data.

18. The system of claim 17, wherein the updated camera calibration data comprises a translation value and a rotation value.

19. A computer-implemented method comprising:
receiving, from a camera included in a device, two images (a) of an environment in which the device is located (b) that each depict a portion of the environment that includes a point and is represented by an environment model of the environment that has a three-dimensional map point at a location that represents the point in the environment, the camera having camera calibration data that identifies a first rotation and a first translation that are both between the camera and a first sensor in the device;

receiving, from an inertial measurement unit included in the device, inertial data for the device, the inertial measurement unit having inertial measurement unit calibration data that identifies a second rotation and a second translation that are both between the inertial measurement unit and a second sensor in the device; and jointly determining, using the two images, the inertial data, the camera calibration data, the inertial measurement unit calibration data, and the location for the three-dimensional map point or an initial estimated position of the device in the environment:
  a) updated camera calibration data that identifies an updated first rotation and an updated first translation between the camera and the first sensor;
  b) updated inertial measurement unit calibration data that identifies an updated second rotation and an updated second translation between the inertial measurement unit and the second sensor; and
  c) at least one of (i) an updated estimated position of the device in the environment or (ii) an updated environment model of the environment in which the device is located including an updated location for the three-dimensional map point.

20. A non-transitory computer storage medium encoded with instructions that, when executed by one or more computers, cause the one or more computers to perform operations comprising:
receiving, from a camera included in a device, two images (a) of an environment in which the device is located (b) that each depict a portion of the environment that includes a point and is represented by an environment model of the environment that has a three-dimensional map point at a location that represents the point in the environment, the camera having camera calibration data that identifies a first rotation and a first translation that are both between the camera and a first sensor in the device;

receiving, from an inertial measurement unit included in the device, inertial data for the device, the inertial measurement unit having inertial measurement unit calibration data that identifies a second rotation and a second translation that are both between the inertial measurement unit and a second sensor in the device; and jointly determining, using the two images, the inertial data, the camera calibration data, the inertial measurement unit calibration data, and the location for the three-dimensional map point or an initial estimated position of the device in the environment:
  a) updated camera calibration data that identifies an updated first rotation and an updated first translation between the camera and the first sensor;
  b) updated inertial measurement unit calibration data that identifies an updated second rotation and an updated second translation between the inertial measurement unit and the second sensor; and
  c) at least one of (i) an updated estimated position of the device in the environment or (ii) an updated environment model of the environment in which the device is located including an updated location for the three-dimensional map point.

* * * * *